US012683655B2

(12) United States Patent
Ramireddy et al.

(10) Patent No.: US 12,683,655 B2
(45) Date of Patent: Jul. 14, 2026

(54) METHODS AND APPARATUSES WITH CSI OMISSION FOR LINEAR COMBINATION PORT-SELECTION CODEBOOK

(71) Applicant: Fraunhofer-Gesellschaft zur Förderung der angewandten Forschung e.V., Munich (DE)

(72) Inventors: Venkatesh Ramireddy, Erlangen (DE); Marcus Grossmann, Erlangen (DE); Markus Landmann, Erlangen (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 235 days.

(21) Appl. No.: 18/282,039

(22) PCT Filed: Mar. 15, 2022

(86) PCT No.: PCT/EP2022/056620
§ 371 (c)(1),
(2) Date: Sep. 14, 2023

(87) PCT Pub. No.: WO2022/194822
PCT Pub. Date: Sep. 22, 2022

(65) Prior Publication Data
US 2024/0171229 A1     May 23, 2024

(30) Foreign Application Priority Data
Mar. 19, 2021     (EP) .................................... 21163790

(51) Int. Cl.
*H04B 7/0456*     (2017.01)
*H04B 7/0417*     (2017.01)
*H04B 7/06*     (2006.01)

(52) U.S. Cl.
CPC ......... *H04B 7/0486* (2013.01); *H04B 7/0417* (2013.01); *H04B 7/0626* (2013.01)

(58) Field of Classification Search
CPC .. H04B 7/0417; H04B 7/0456; H04B 7/0478; H04B 7/0479; H04B 7/0481;
(Continued)

(56) References Cited

U.S. PATENT DOCUMENTS 9,326,178 B2 *     4/2016     Jung ...................... H04L 5/0094
10,833,747 B2 *     11/2020     Muruganathan ..... H04B 7/0456
(Continued)

FOREIGN PATENT DOCUMENTS

EP          3734852 A1     11/2020
WO     WO 2019164719 A1     8/2019
WO     WO2020182269 A1     9/2020

OTHER PUBLICATIONS

International Preliminary Report on Patentability, Mar. 15, 2022, International Preliminary Examining Authority, European Patent Office, International Application No. PCT/EP2022/056620.
(Continued)

*Primary Examiner* — Frank Duong
(74) *Attorney, Agent, or Firm* — Burr & Forman LLP; Nathaniel T. Quirk, Esq.

(57)          ABSTRACT

Methods and apparatuses for the generation and transmission/reception of a CSI report. A method performed by a UE includes: receiving a CSI report configuration from a network node; determining a number of precoder coefficients for RI transmission layers of a precoder vector or matrix; grouping the precoder coefficients of the RI transmission layers into at least two coefficient subsets, assigning a certain ordering to said at least two coefficient subsets and to the precoder coefficients within each coefficient subset; dividing said at least two coefficient subsets into two or more
(Continued)

CSI groups having associated priority levels; generating a CSI report comprising a CSI part 1 and a CSI part 2; and transmitting a UCI including the CSI report over a UL channel to the network node.

17 Claims, 10 Drawing Sheets

(58) Field of Classification Search
CPC .. H04B 7/0486; H04B 7/0621; H04B 7/0626; H04B 7/063; H04B 7/0632; H04B 7/0634; H04B 7/0639; H04B 7/065; H04B 7/0658; H04W 72/21
See application file for complete search history.

(56) References Cited

U.S. PATENT DOCUMENTS

| | | | |
|---|---|---|---|
| 2021/0075487 A1 | 3/2021 | Rahman et al. | |
| 2021/0143885 A1* | 5/2021 | Großmann | H04B 7/0639 |
| 2021/0226674 A1* | 7/2021 | Ramireddy | H04B 7/0626 |
| 2022/0224391 A1* | 7/2022 | Ramireddy | H04B 7/0621 |
| 2022/0247459 A1* | 8/2022 | Faxer | H04B 7/0626 |

OTHER PUBLICATIONS

Office Action issued on Mar. 19, 2025, Korean Intellectual Property Office, Korean Patent Application No. 10-2023-7035423.
English translation of Office Action issued by the Korean Intellectual Property Office on Jul. 9, 2025, Korean Patent Application No. 10-2023-7035423.
Office Action issued on Jan. 6, 2026, Japan Intellectual Property Office, Japanese Patent Application No. P22-0004JP.

* cited by examiner

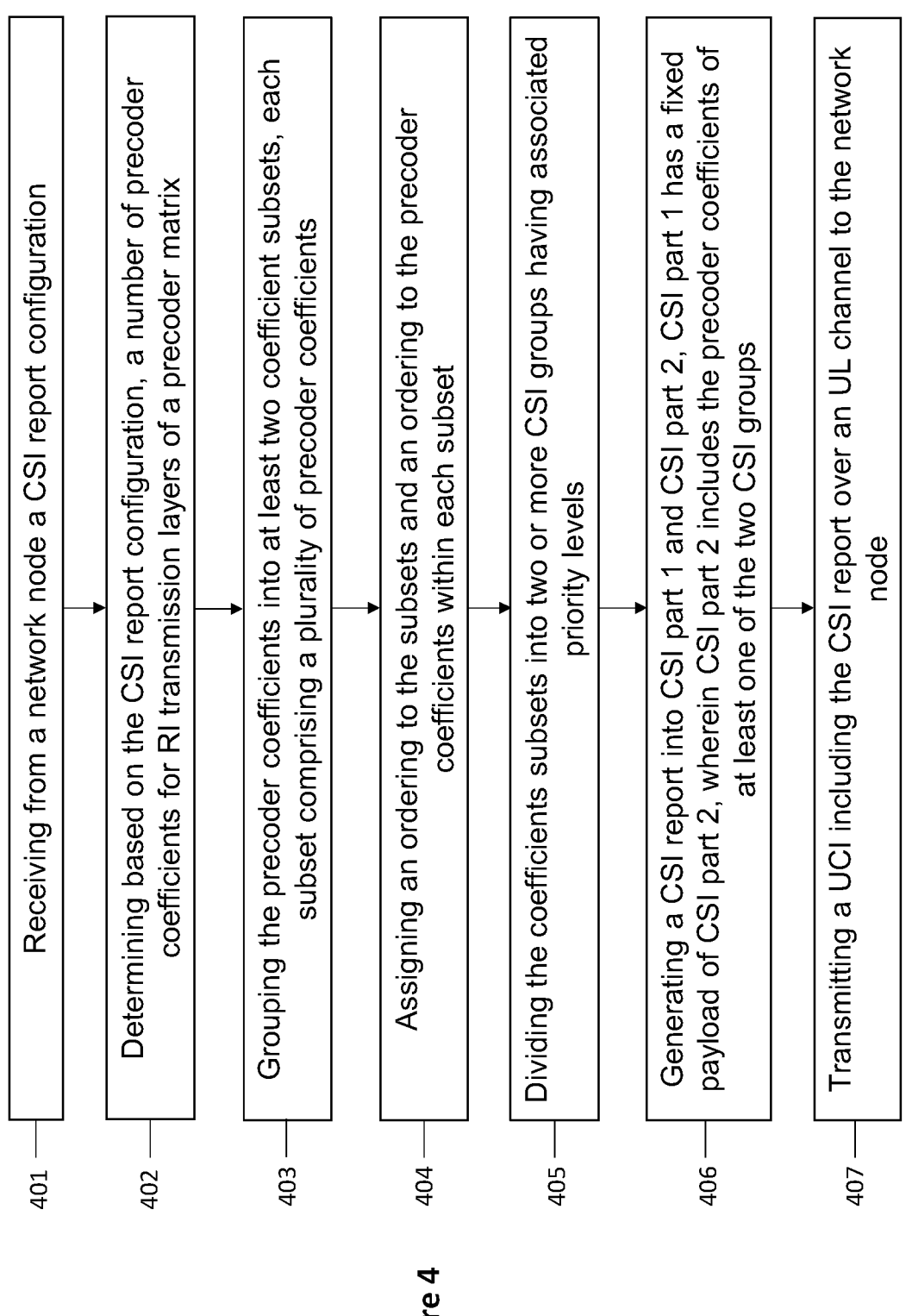

401   Receiving from a network node a CSI report configuration

402   Determining based on the CSI report configuration, a number of precoder coefficients for RI transmission layers of a precoder matrix 403   Grouping the precoder coefficients into at least two coefficient subsets, each subset comprising a plurality of precoder coefficients 404   Assigning an ordering to the subsets and an ordering to the precoder coefficients within each subset 405   Dividing the coefficients subsets into two or more CSI groups having associated priority levels 406   Generating a CSI report into CSI part 1 and CSI part 2, CSI part 1 has a fixed payload of CSI part 2, wherein CSI part 2 includes the precoder coefficients of at least one of the two CSI groups 407   Transmitting a UCI including the CSI report over an UL channel to the network node

| Indexing based on local port indices $U = \{0, \ldots, 2P' - 1\}$ | Selected coefficients of layer 0 | Selected coefficients of layer 1 | Precoder coefficients of layer 0 associated with the first coefficient subset | Precoder coefficients of layer 1 associated with the second coefficient subset | Precoder coefficients of layer 0 associated with the second coefficient subset | Precoder coefficients of layer 1 associated with the second coefficient subset |
|---|---|---|---|---|---|---|
| 0 | X | X | X | X | | |
| 1 | X | | X | | | |
| 2 | X | | X | | | |
| 3 | X | | X | | | |
| 4 | X | X | | | X | X |
| 5 | X | X | | | X | X |
| 6 | | | | | | |
| 7 | | | | | | |
| 8 | | X | | X | | |
| 9 | X | X | X | X | | |
| 10 | X | | X | | | |
| 11 | X | X | X | X | | |
| 12 | | | | | | |
| 13 | X | X | | | X | X |
| 14 | X | | | | X | |
| 15 | X | X | | | X | X |

| Indexing based on global port indices $U' = \{0, ..., 2P - 1\}$ | Selected coefficients of layer 0 | Indexing based on local port indices $U = \{0, ..., 2P' - 1\}$ |
|---|---|---|
| 0 | X | 0 |
| 1 | X | 1 |
| 2 | X | 2 |
| 3 | | |
| 4 | | 3 |
| 5 | | |
| 6 | | 4 |
| 7 | X | 5 |
| 8 | X | 6 |
| 9 | X | 7 |
| 10 | | |
| 11 | X | 8 |
| 12 | X | 9 |
| 13 | | 10 |
| 14 | | |
| 15 | X | 11 |

| Indexing based on global port indices $U' = \{0, ..., 2P - 1\}$ | Selected coefficients of layer 0 | Selected coefficients of layer 1 | Indexing based on local port indices $U = \{0, ..., 2P' - 1\}$ | Precoder coefficients of layer 0 associated with the first coefficient subset | Precoder coefficients of layer 1 associated with the first coefficient subset | Precoder coefficients of layer 0 associated with the second coefficient subset | Precoder coefficients of layer 1 associated with the second coefficient subset |
|---|---|---|---|---|---|---|---|
| 0 | X | X | 0 | X | X | | |
| 1 | X | | 1 | X | | | |
| 2 | X | X | 2 | X | X | | |
| 3 | | | | | | | |
| 4 | | X | 3 | | | | X |
| 5 | | | | | | | |
| 6 | X | X | 4 | X | | | X |
| 7 | X | X | 5 | X | | | X |
| 8 | X | | 6 | X | | | |
| 9 | X | X | 7 | X | X | | |
| 10 | | | | | | | |
| 11 | X | | 8 | X | | | |
| 12 | X | | 9 | | | X | |
| 13 | | X | 10 | | | | X |
| 14 | | | | | | | |
| 15 | X | X | 11 | | | X | X |

| Indexing based on global port indices $U' = \{0, ..., 2P - 1\}$ | Selected coefficients of layer 0 and delay index 0 | ... | Selected coefficients of layer 0 and delay index $D'$-1 | Indexing based on local port indices $U = \{0, ..., 2P' - 1\}$ |
|---|---|---|---|---|
| 0 | X | ... | X | 0 |
| 1 | X | ... | | 1 |
| 2 | X | ... | X | 2 |
| 3 | | ... | | |
| 4 | | ... | X | 3 |
| 5 | | ... | | |
| 6 | | ... | X | 4 |
| 7 | X | ... | X | 5 |
| 8 | X | ... | | 6 |
| 9 | X | ... | X | 7 |
| 10 | | ... | | |
| 11 | X | ... | | 8 |
| 12 | X | ... | | 9 |
| 13 | | ... | X | 10 |
| 14 | | ... | | |
| 15 | X | ... | X | 11 |

Figure 8

METHODS AND APPARATUSES WITH CSI OMISSION FOR LINEAR COMBINATION PORT-SELECTION CODEBOOK

CROSS-REFERENCE TO RELATED APPLICATION

This application is a national stage application, filed under 35 U.S.C. § 371, of International Patent Application No. PCT/EP2022/056620 filed on Mar. 15, 2022, and European Patent Application No. 21163790.5 filed on Mar. 19 2021, which are incorporated by reference herein in their entirety.

TECHNICAL FIELD

The present disclosure relates to the field of wireless communications, more particularly to Channel State Information (CSI) feedback reporting for Uplink Channel Information (UCI) or CSI omission schemes for a codebook-based precoding in a wireless communications system. Some embodiments are related to a User Equipment (UE) and a method performed by the UE for CSI reporting and in some other embodiments to a network node and a method performed by the network node for receiving the CSI report generated by the UE.

BACKGROUND

The fifth generation (5G) mobile communications system also known as new radio (NR) provides a higher level of performance than the previous generations of mobile communications system. 5G mobile communications has been driven by the need to provide ubiquitous connectivity for applications as diverse automotive communication, remote control with feedback, video downloads, as well as data applications for Internet-of-Things (IoT) devices, machine type communication (MTC) devices, etc. 5G wireless technology brings several main benefits, such as faster speed, shorter delays and increased connectivity. The third-generation partnership project (3GPP) provides the complete system specification for the 5G network architecture, which includes at least a radio access network (RAN), core transport networks (CN) and service capabilities.

FIG. 1 illustrates a simplified schematic view of an example of a wireless communications network 100 including a core network (CN) 110 and a radio access network (RAN) 120. The RAN 120 is shown including a plurality of network nodes or radio base stations, which in 5G are called gNBs. Three radio base stations are depicted gNB1, gNB2 and gNB3. Each gNB serves an area called a coverage area or a cell. FIG. 1 illustrates 3 cells 121, 122 and 123, each served by its own gNB, gNB1, gNB2 and gNB3, respectively. It should be mentioned that the network 100 may include any number of cells and gNBs. The radio base stations, or network nodes serve users within a cell. In 4G or LTE, a radio base station is called an eNB, in 3G or UMTS, a radio base station is called an eNodeB, and BS in other radio access technologies. A user or a user equipment (UE) may be a wireless or a mobile terminal device or a stationary communication device. A mobile terminal device or a UE may also be an IoT device, an MTC device, etc. IoT devices may include wireless sensors, software, actuators, and computer devices. They can be imbedded into mobile devices, motor vehicle, industrial equipment, environmental sensors, medical devices, aerial vehicles and more, as well as network connectivity that enables these devices to collect and exchange data across an existing network infrastructure.

Referring back to FIG. 1, each cell is shown including UEs and IoT devices. gNB1 in cell 121 serves UE1 121A, UE2 121B and IoT device 121C. Similarly, gNB2 in cell 121 serves UE3 122A, UE4 122B and IoT device 122C, and gNB3 in cell 123 serves UE5 123A, UE6 123B and IoT device 123C. The network 100 may include any number of UEs and IoT devices or any other types of devices. The devices communicate with the serving gNB(s) in the uplink and the gNB(s) communicate with the devices in the downlink. The respective base station gNB1 to gNB3 may be connected to the CN 120, e.g., via the S1 interface, via respective backhaul links 111, 121D, 122D, 123D, which are schematically depicted in FIG. 1 by the arrows pointing to "core". The core network 120 may be connected to one or more external networks, such as the Internet. The gNBs may be connected to each other via the S1 interface or the X2 interface or the XN interface in 5G, via respective interface links 121E, 122E and 123E, which is depicted in the figure by the arrows pointing to gNBs.

For data transmission, a physical resource grid may be used. The physical resource grid may comprise a set of resource elements (REs) to which various physical channels and physical signals are mapped. For example, the physical channels may include the physical downlink, uplink and/or sidelink (SL) shared channels (PDSCH, PUSCH, PSSCH) carrying user specific data, also referred to as downlink, uplink or sidelink payload data, the physical broadcast channel (PBCH) carrying for example a master information block (MIB) and a system information block (SIB), the physical downlink, uplink and/or sidelink control channels (PDCCH, PUCCH, PSCCH) carrying for example the downlink control information (DCI), the uplink control information (UCI) or the sidelink control information (SCI). For the uplink, the physical channels may further include the physical random-access channel (PRACH or RACH) used by UEs for accessing the network once a UE is synchronized and obtains the MIB and SIB. The physical signals may comprise reference signals (RS), synchronization signals (SSs) and the like. The resource grid may comprise a frame or radio frame having a certain duration, like 10 milliseconds, in the time domain and having a given bandwidth in the frequency domain. The radio frame may have a certain number of subframes of a predefined length, e.g., 2 subframes with a length of 1 millisecond. Each subframe may include two slots of a number of OFDM symbols depending on the cyclic prefix (CP) length. IN 5G, each slot consists of 14 OFDM symbols or 12 OFDM symbols based on normal CP and extended CP respectively. A frame may also consist of a smaller number of OFDM symbols, e.g., when utilizing shortened transmission time intervals (TTIs) or a mini-slot/non-slot-based frame structure comprising just a few OFDM symbols. Slot aggregation is supported in 5G NR and hence data transmission can be scheduled to span one or multiple slots. Slot format indication informs a UE whether an OFDM symbol is downlink, uplink or flexible.

The wireless communication network system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g., DFT-OFDM. Other waveforms, like non-orthogonal waveforms for multiple access, e.g., filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR (New Radio) standard.

The wireless communications network system depicted in FIG. 1 may be a heterogeneous network having two distinct overlaid networks, a network of macro cells with each macro cell including a macro base station, like base station gNB1 to gNB3, and a network of small cell base stations (not shown in FIG. 1), like femto- or pico-base stations. In addition to the above described wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-advanced pro standard or the 5G or NR, standard.

In the wireless communications network system such as the one depicted schematically in FIG. 1, multi-antenna techniques may be used, e.g., in accordance with LTE, NR or any other communication system, to improve user data rates, link reliability, cell coverage and network capacity. To support multi-stream or multi-layer transmissions, linear precoding is used in the physical layer of the communication system. Linear precoding is performed by a precoder matrix which maps layers of data to antenna ports. The precoding may be seen as a generalization of beamforming, which is a technique to spatially direct or focus a data transmission towards an intended receiver. The precoder matrix to be used at the gNB to map the data to the transmit antenna ports is decided using the CSI.

In the wireless communications network system as described above, such as LTE or New Radio (5G), downlink signals convey data signals, control signals containing downlink, DL, control information (DCI), and a number of reference signals or symbols (RS) used for different purposes. A gNodeB (or gNB or base station) transmits data and downlink control information (DCI) through the so-called physical downlink shared channel (PDSCH) and physical downlink control channel (PDCCH) or enhanced PDCCH (ePDCCH), respectively. Moreover, the downlink signal(s) of the gNB may contain one or multiple types of reference signals (RSs) including a common RS (CRS) in LTE, a channel state information RS (CSI-RS), a demodulation RS (DM-RS), and a phase tracking RS (PT-RS). The CRS is transmitted over a DL system bandwidth part and used at the user equipment (UE) to obtain a channel estimate to demodulate the data or control information. The CSI-RS is transmitted with a reduced density in the time and frequency domain compared to CRS and used at the UE for channel estimation or for channel state information (CSI) acquisition. The DM-RS is transmitted only in a bandwidth part of the respective PDSCH and used by the UE for data demodulation. For signal precoding at the gNB, several CSI-RS reporting mechanisms are used such as non-precoded CSI-RS and beamformed CSI-RS reporting. For a non-precoded CSI-RS, a one-to-one mapping between a CSI-RS port and a transceiver unit, TXRU, of the antenna array at the gNB is utilized. Therefore, non-precoded CSI-RS provides a cell-wide coverage where the different CSI-RS ports have the same beam direction and beam width. For beamformed/precoded UE-specific or non-UE-specific CSI-RS, a beamforming operation is applied over a single antenna port or over multiple antenna ports to have several narrow beams with high gain in different directions and, therefore, no cell-wide coverage.

In a wireless communication system employing time division duplexing, TDD, due to channel reciprocity, the channel state information (CSI) is available at the base station (gNB). However, when employing frequency division duplexing, FDD, due to the absence of channel reciprocity, the channel is estimated at the UE and the estimate is fed back to the gNB. FIG. 2 shows a block-based model of a MIMO DL transmission using codebook-based-precoding in accordance with LTE release 8. FIG. 2 shows schematically the base station 200, gNB, the user equipment, UE, 202 and the channel 204, like a radio channel for a wireless data communication between the base station 200 and the user equipment 202. The base station includes an antenna array $ANT_T$ having a plurality of antennas or antenna elements, and a precoder 206 receiving a data vector 208 and a precoder matrix F from a codebook 210. The channel 204 may be described by the channel tensor/matrix 212. The user equipment 202 receives the data vector 214 via an antenna or an antenna array $ANT_R$ having a plurality of antennas or antenna elements. A feedback channel 216 between the user equipment 202 and the base station 200 is provided for transmitting feedback information. The previous releases of 3GPP up to Rel. 15 support the use of several downlink reference symbols (such as CSI-RS) for CSI estimation at the UE.

In FDD systems (up to Rel. 15), the estimated channel at the UE is reported to the gNB implicitly where the CSI report transmitted by the UE over the feedback channel includes the rank index (RI), the precoding matrix index (PMI) and the channel quality index (COI) (and the CRI from Rel. 13) allowing, at the gNB, to decide the precoding matrix, and the modulation order and coding scheme (MCS) of the symbols to be transmitted. The PMI and the RI are used to determine the precoding matrix from a predefined set of matrices $\Omega$ also referred to as codebook. The codebook, e.g., in accordance with LTE, may be a look-up table with matrices in each entry of the table, and the PMI and RI from the UE decide from which row and column of the table the precoder matrix to be used is obtained. The precoders and codebooks are designed up to Rel. 15 for gNBs equipped with one-dimensional Uniform Linear Arrays (ULAs) having $N_1$ dual-polarized antennas (in total $N_t=2N_1$ antennas), or with two-dimensional Uniform Planar Arrays (UPAs) having dual-polarized antennas at $N_1N_2$ positions (in total $N_t=2N_1N_2$ antennas). The ULA allows controlling the radio wave in the horizontal (azimuth) direction only, so that azimuth-only beamforming at the gNB is possible, whereas the UPA supports transmit beamforming on both vertical (elevation) and horizontal (azimuth) directions, which is also referred to as full-dimension (FD) MIMO. The codebook, e.g., in the case of massive antenna arrays such as FD-MIMO, may be a set of beamforming weights that forms spatially separated electromagnetic transmit/receive beams using the array response vectors of the array. The beamforming weights (also referred to as the array steering vectors) of the array are amplitude gains and phase adjustments that are applied to the signal fed to the antennas (or the signal received from the antennas) to transmit (or obtain) a radiation towards (or from) a particular direction. The components of the precoder matrix are obtained from the codebook, and the PMI and the RI are used to read the codebook and obtain the precoder. The array steering vectors may be described by the columns of a 2D Discrete Fourier Transform (DFT) matrix when ULAs or UPAs are used for signal transmission.

The precoder matrices used in the Type-I and Type-II CSI reporting schemes in 3GPP New Radio Rel. 15 are defined in the frequency-domain and have a dual-stage structure (i.e., two components codebook): $F(s)=F_1F_2(s)$, $s=0$ . . . , $S-1$, where S denotes the number of subbands. The first component or the so-called first stage precoder, $F_1$, is used to select a number of beam vectors and rotation oversampling factors from a Discrete Fourier Transform-based (DFT-based) matrix, which is also called the spatial codebook. Moreover, the first stage precoder, $F_1$, corresponds to a wide-band matrix, independent of the subband index s, and contains L spatial beamforming vectors (the so-called spatial beams) $b_l \in \mathbb{C}^{N_1N_2\times1}$, $l=0$, . . . , $L-1$ selected from a DFT-based codebook matrix for the two polarizations of the antenna array, $$F_1 = \begin{bmatrix} b_0, .., b_{L-1} & 0 \ldots 0 \\ 0 \ldots 0 & b_0, .., b_{L-1} \end{bmatrix} \in \mathbb{C}^{2N_1N_2\times2L}.$$

The first component or the so-called first stage precoder, $F_1$, is used to select a number of spatial domain (SD) or beam vectors and the rotation oversampling factors from a Discrete Fourier Transform-based (DFT-based) matrix which is also called the spatial codebook. The spatial codebook comprises an oversampled DFT matrix of dimension $N_1N_2\times N_1O_1N_2O_2$, where $O_1$ and $O_2$ denote the oversampling factors with respect to the first and second dimension of the codebook, respectively. The DFT vectors in the codebook are grouped into $(q_1, q_2)$, $0\leq q_1\leq O_1-1$, $0\leq q_2\leq O_2-1$ subgroups, where each subgroup contains $N_1N_2$ DFT vectors, and the parameters $q_1$ and $q_2$ are denoted as the rotation oversampling factors, with respect to the first and second dimension of the antenna array, respectively.

The second component or the so-called second stage precoder, $F_2(s)$, is used to combine the selected beam vectors. This means the second stage precoder, $F_2(s)$, corresponds to a selection/combining/co-phasing matrix to select/combine/co-phase the beams defined in $F_1$ for the s-th configured sub-band. For example, for a rank-1 transmission and Type-I CSI reporting, $F_2(s)$ is given for a dual-polarized antenna array by $$F_2(s) = \begin{bmatrix} e_u \\ e^{j\delta_1}e_u \end{bmatrix} \in \mathbb{C}^{2L\times1},$$

where $e_u \in \mathbb{C}^{L\times1}$ contains zeros at all positions, except the u-th position which is one. Such a definition of $e_u$ selects the u-th vector in $F_1$ per polarization of the antenna. Furthermore, $e^{j\delta_1}$ is a quantized phase adjustment for the second polarization of the antenna array. For example, for a rank-1 transmission and Type-II CSI reporting, $F_2(s)$ is given for dual-polarized antenna arrays by $$F_2(s) = \begin{bmatrix} e^{j\delta_0}p_0 \\ \vdots \\ e^{j\delta_{2L-1}}p_{2L-1} \end{bmatrix} \in \mathbb{C}^{2L\times1}$$

where $p_l$ and $e^{j\delta_l}$, $l=0, 1, 2, \ldots, 2L-1$ are quantized amplitude and phase beam-combining coefficients, respectively. For rank-R transmission, $F_2(s)$ contains R vectors, wherein R denotes the transmission rank, where the entries of each vector are chosen to combine single or multiple beams within each polarization.

The selection of the matrices $F_1$ and $F_2(s)$ is performed by the UE based on reference signals such as CSI-RS and the knowledge of the channel conditions. The selected matrices are indicated in a CSI report in the form of a RI (the RI denotes the rank of the precoding matrices) and a PMI, and are used at the gNB to update the multi-user precoder for the next transmission time interval.

For the 3GPP Rel.-15 dual-stage Type-II CSI reporting, the second stage precoder, $F_2(s)$, is calculated on a subband basis such that the number of columns of $$F_2 = \begin{bmatrix} F_2^{(r)}(0) & \ldots & F_2^{(r)}(s) & \ldots & F_2^{(r)}(S-1) \end{bmatrix}$$

for the r-th transmission layer depends on the number of configured CQI subbands S. Here, a subband refers to a group of adjacent physical resource blocks (PRBs). A drawback of the Type-II CSI feedback is the large feedback overhead for reporting the combining coefficients on a subband basis. The feedback overhead increases approximately linearly with the number of subbands and becomes considerably large for large numbers of subbands. To overcome the high feedback overhead of the Rel.-15 Type-II CSI reporting scheme, it has been decided in 3GPP RAN #81 to study feedback compression schemes for the second stage precoder $F_2$. In several contributions, it has been demonstrated that the number of beam-combining coefficients in $F_2$ may be drastically reduced when transforming $F_2$ using a small set of DFT-based basis vectors into the transform domain referred to as the delay domain. The corresponding three-stage precoder relies on a three-stage (i.e., three components)

$$F_1 F_2^{(r)} F_3^{(r)}$$

codebook. The first component, represented by the matrix $F_1$, is identical to the Rel.-15 NR component, is independent off the transmission layer (r), and contains a number of spatial domain (SD) basis vectors selected from the spatial codebook. The second component, represented by the matrix $$F_3^{(r)},$$

is layer-dependent and is used to select a number of delay domain (DD) basis vectors from a Discrete Fourier Transform-based (DFT-based) matrix which is also called the delay codebook. The third component, represented by the matrix $$F_2^{(r)},$$

contains a number of combining coefficients that are used to combine the selected SD basis vectors and DD basis vectors from the spatial and delay codebooks, respectively.

Assuming a rank-R transmission the three-component precoder matrix or CSI matrix for a configured $2N_1N_2$ antenna/CSI-RS ports and configured S subbands is represented for a first polarization of the antenna ports and r-th transmission layer as $$F^{(r,1)} = \alpha^{(r)} \sum_{l=0}^{L-1} b_l \sum_{d=0}^{D-1} \gamma_{1,l,d}^{(r)} d_d^{(r)}$$

and for a second polarization of the antenna ports and r-th transmission layer as $$F^{(r,2)} = \alpha^{(r)} \sum_{l=0}^{L-1} b_l \sum_{d=0}^{D-1} \gamma_{2,l,d}^{(r)} d_d^{(r)},$$

where $b_u$ (l=0, . . . , L−1) represents the u-th SD basis vector selected from the spatial codebook, $$d_d^{(r)}(d = 0, \dots , D-1)$$

is the d-th DD basis vector associated with the r-th layer selected from the delay codebook, $$\gamma_{p,l,d}^{(r)}$$

is the complex delay-domain combining coefficient associated with the u-th SD basis vector, the d-th DD basis vector and the p-th polarization, D represents the number of configured DD basis vectors, and $\alpha^{(r)}$ is a normalizing scalar.

An advantage of the three-component CSI reporting scheme in the above equations is that the feedback overhead for reporting the combining coefficient of the precoder matrix or CSI matrix is no longer dependent on the number of configured CQI subbands (i.e., it is independent from the system bandwidth). Therefore, the above three-component codebook has been recently adopted for the 3GPP Rel.-16 dual-stage Type-II CSI reporting specification.

The current 3GPP Type-I and Type-II CSI reporting schemes are mainly used in frequency division duplex (FDD) system configurations and do not exploit properties of uplink/downlink channel reciprocity. Contrary to FDD system configurations, channel reciprocity is mainly applicable in time division duplex (TDD) systems in which the same carrier is used for uplink and downlink transmissions. Channel measurements performed in the uplink at the base station (gNB) may be used to support downlink transmissions, for example downlink beamforming, without additional feedback or with reduced feedback from the UE.

In FDD systems, channel reciprocity is usually not satisfied since the duplex distance between the uplink and the downlink carriers may be larger than the channel coherence bandwidth. A known approach to obtain CSI even in FDD systems at the base station without UE assistance is based on channel extrapolation. There, it is assumed that the downlink channel and/or its multipath parameters may be calculated by an extrapolation of the channel response (or its multipath parameters) measured in the uplink. However, measurement results show that such an extrapolation, especially with respect to the phase of the multipath components of the channel, may be inaccurate and lead to inaccurate results. Recently, it was found that for a variety of scenarios the spatial and delay properties of the uplink and downlink channel responses in FDD systems are strongly correlated, hence, the channel may be considered as partial reciprocal with respect to the angle(s) and delay(s) of the multipath components.

In current Release 16 Type-II CSI reporting the UE needs to calculate a set of beams or beamforming vectors, a set of delays or delay vectors, and a set of precoder coefficients for the selected beams and delays of the precoder matrix. This, however, results in an increased complexity of the precoder calculation and a feedback overhead of the CSI report. Further, the calculation and reporting of the beams and delays is based on codebooks with a limited resolution, i.e., the information of angles and delays of multipath components of the channel is available at the base station or a network node only with a reduced resolution due to its quantization with a codebook. This reduces the performance of a corresponding precoded downlink transmission employing the precoder coefficients reported by the UE.

Uplink control information, UCI, omission occurs when the uplink resources provided by a base station or a network node to the user equipment for an uplink transmission is not sufficient to carry the entire content of one or more CSI report(s). In detail, the base station or network node provides via a downlink channel (e.g., PDCCH) a resource allocation for an uplink transmission of one or more CSI report(s) to the UE. The uplink transmission may be performed by the UE via the PUCCH or PUSCH.

When the resource allocation provided by the base station to the user equipment is not sufficient, the user equipment may drop a part of the one or more CSI report(s) and/or one or more of the CSI report(s) to be used for the uplink transmission. For example, the base station may allocate resources for a rank-1 (RI=1) CSI report, but the UE determines a rank-2 transmission and reports a rank-2 (RI=2) CSI report of which size is larger than the size of the allocated resources, e.g., PUSCH resources. In such a case, the UE has to drop or omit a portion of the CSI content of the one or more CSI reports. For CSI reporting schemes relying on information of angles and delays of the channel at the base station, UCI omission procedures for CSI reporting do not exist and hence new UCI omission procedures are required.

There are thus drawbacks with the known solutions as described above and the present invention according to the present disclosure addresses these drawbacks.

SUMMARY

It is an objective of the embodiments herein to provide apparatuses and methods for CSI feedback reporting for a codebook based precoding in a wireless communications network such as advanced 5G networks.

According to an aspect of some embodiments herein, there is provided a method performed by a user equipment, for generating and reporting a CSI report in a wireless communications system, the method comprising: receiving a CSI report configuration from a network node; determining based on the received CSI report configuration, a number of precoder coefficients for Rank Index, RI, transmission layers of a precoder vector or matrix; grouping the precoder coefficients of the RI transmission layers into at least two coefficient subsets, each coefficient subset comprising a plurality of precoder coefficients; assigning an ordering to said at least two coefficient subsets and an ordering to the precoder coefficients within each coefficient subset; dividing said at least two coefficient subsets into two or more CSI groups having associated priority levels; generating a CSI report comprising a CSI part 1 and a CSI part 2, wherein the CSI part 1 has a fixed payload size and comprises information indicating the size of the payload of the CSI part 2, wherein the CSI part 1 includes the precoder coefficients of at least one of the two CSI groups; and transmitting an uplink control information (UCI) including the CSI report over an uplink, UL, channel to the network node.

According to another aspect of some embodiments herein, there is provided a method performed by a network node for receiving a CSI report generated by a UE, in a wireless communications system, the method comprising: transmitting to the UE, a CSI report configuration for enabling the UE to determine based on the transmitted CSI report configuration a number of precoder coefficients for RI transmission layers of a precoder vector or matrix; receiving from the UE, over an uplink channel, an UCI including the CSI report generated by the UE, the CSI report comprising a CSI part 1 and a CSI part 2, wherein CSI part 1 has a fixed payload size and comprises information indicating the size of the payload of CSI part 2, wherein CSI part 2 includes the precoder coefficients of the at least one of the two or more CSI groups, and wherein the precoder coefficients are ordered in at least two ordered coefficient subsets.

According to another aspect of some embodiments herein, there is provided a UE comprising a processor and a memory containing instructions executable by the processor, whereby said UE is operative or configured to perform any one of the embodiments presented in the detailed description related to the actions performed by the UE, in accordance with the embodiments disclosed herein.

According to yet another aspect of embodiments herein, there is provided a network node comprising a processor and a memory containing instructions executable by the processor, whereby said network node is operative or configured to perform any one of the embodiments presented in the detailed description related to the network node, in accordance with the embodiments disclosed herein.

There is also provided a computer program comprising instructions which when executed on at least one processor of the UE, cause the at least said one processor to carry out the actions or method steps presented herein.

There is also provided a computer program comprising instructions which when executed on at least one processor of the network node, cause the at least said one processor to carry out the method steps presented herein.

A carrier is also provided containing the computer program, wherein the carrier is one of a computer readable storage medium; an electronic signal, optical signal, or a radio signal.

Advantages achieved by the embodiments of the present invention include significantly reducing the feedback overhead and the computational complexity at the user equipment for codebook-based CSI reporting, assuming information of angles and delays of multipath components of the channel is available at the base station, are proposed.

BRIEF DESCRIPTION OF THE DRAWINGS

Embodiments of the present invention are now described in further detail with reference to the accompanying drawings, in which:

FIG. 4 illustrates a flowchart of the method steps performed by a UE according to some embodiments herein;

FIG. 5 is a table exemplifying a relation between an indexing based on local port indices and precoder coefficients of coefficient subsets of layer 0 and of layer 1, according to an exemplary embodiment herein;

FIG. 6 is another table exemplifying a relation between an indexing based on global port indices respectively on local port indices and selected precoder coefficients of layer 0 according to another exemplary embodiment herein;

FIG. 7 is another table exemplifying a relation between an indexing based on global port indices respectively on local port indices and selected precoder coefficients of coefficient subsets of layer 0 and of layer 1 according to yet another exemplary embodiment herein;

FIG. 8 is yet another table exemplifying a relation between an indexing based on global port indices respectively on local port indices and selected precoder coefficients of layer 0 according to another exemplary embodiment herein;

DETAILED DESCRIPTION

Figure 1:
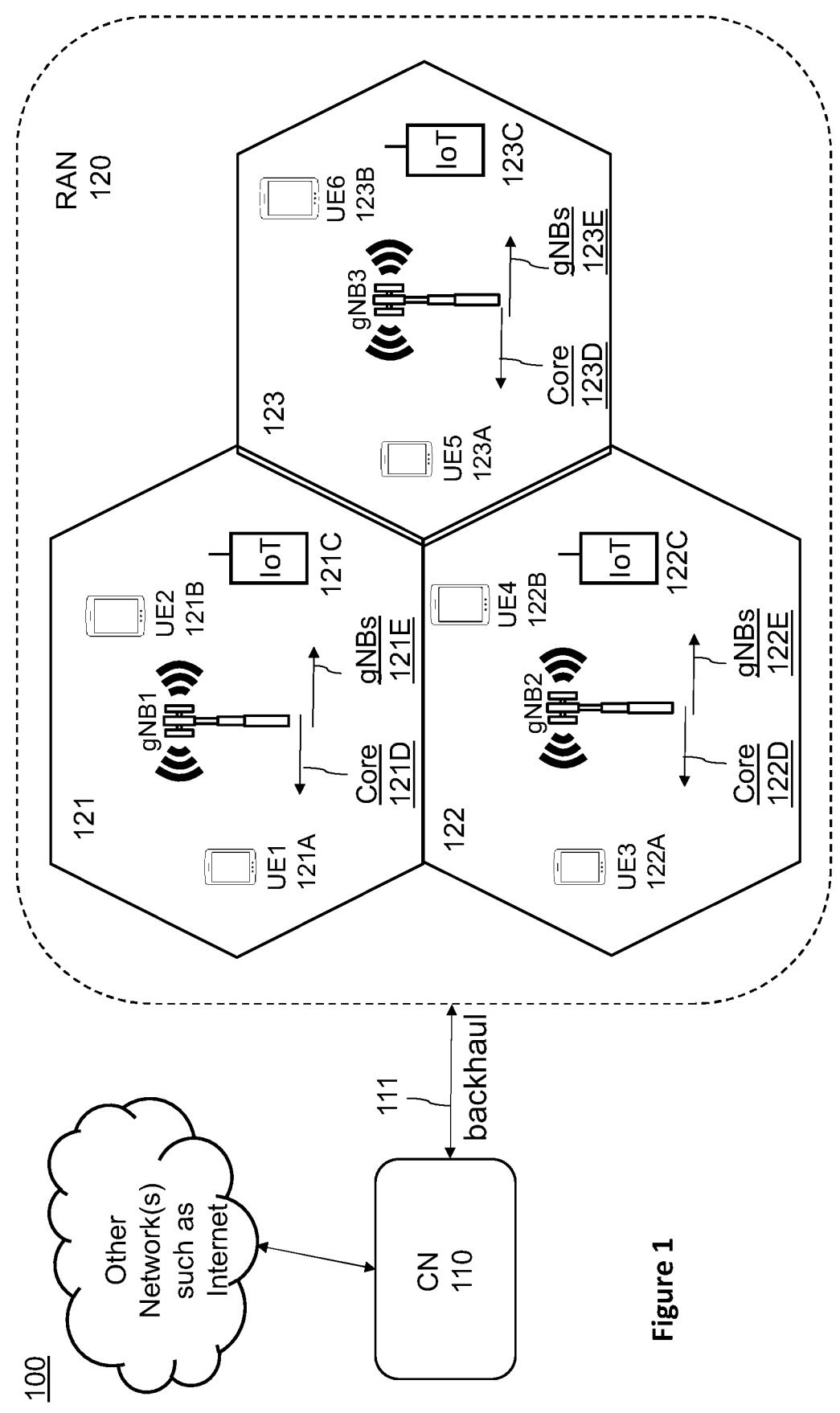
FIG. 1 shows a schematic representation of a wireless communications system.

In the following, a detailed description of the exemplary embodiments is described in conjunction with the drawings, in several scenarios to enable easier understanding of the solution(s) described herein.

The invention according to the present embodiment addresses the previously described drawbacks. In detail, methods that significantly reduce the feedback overhead and the computational complexity at the user equipment for codebook-based CSI reporting and UCI or CSI omission based on a linear combination port-selection codebook, assuming information of angles and delays and/or Doppler components of multipath components of the channel is available at the base station or at the network node, are proposed.

In general, and in accordance with some non-limiting exemplary effects achieved by the embodiments herein include angular and delay information that are obtained at the gNB or at the network node from the UE by uplink channel sounding measurements which is then used to precode/beamform a set of CSI-RS resources. The precoded/beamformed CSI-RS resources are used for downlink channel measurements and CSI calculations at the UE. Based on the downlink measurements of the precoded/beamformed CSI-RS, the UE calculates and reports a set of complex precoder coefficients for the configured antenna ports, wherein each antenna port is assumed to be associated at least with one beam and one delay. As the UE only determines a set of precoder coefficients for the configured antenna ports and does not require to calculate beams and delays for the precoder matrix as in Type-II CSI reporting, the complexity of the precoder calculation and the feedback overhead of the CSI report can be reduced drastically. Moreover, as the information of the angles and delays of the multipath components of the channel is available at the base station (or the network node of the gNB) with a high resolution and not quantized with a codebook and reported by the UE, the performance of the corresponding precoded downlink transmission employing the precoder coefficients reported by the UE is significantly higher than the performance achieved by the current Release 15 or Release 16 Type-II CSI reporting schemes.

In general, and in accordance with some non-limiting exemplary effects achieved by the embodiments herein include angular and delay information and/or Doppler information that are obtained at the gNB or at the network node from the UE by uplink channel sounding measurements which is then used to precode/beamform a set of CSI-RS resources. The precoded/beamformed CSI-RS resources are used for downlink channel measurements and CSI calculations at the UE. Based on the downlink measurements of the precoded/beamformed CSI-RS, the UE calculates and reports a set of complex precoder coefficients for the configured antenna ports, wherein each antenna port is assumed to be associated at least with one beam and one delay and one Doppler component. As the UE only determines a set of precoder coefficients for the configured antenna ports and does not require to calculate beams and delays and Doppler components for the precoder matrix as in Type-II CSI reporting, the complexity of the precoder calculation and the feedback overhead of the CSI report can be reduced drastically. Moreover, as the information of the angles and delays and/or Doppler frequencies of the multipath components of the channel is available at the base station (or the network node of the gNB) with a high resolution and not quantized with a codebook and reported by the UE, the performance of the corresponding precoded downlink transmission employing the precoder coefficients reported by the UE is significantly higher than the performance achieved by the current Release 15 or Release 16 Type-II CSI reporting schemes.

The invention according to the present embodiment also addresses the previously described drawbacks. In detail, methods that significantly reduce the feedback overhead at the user equipment for codebook-based CSI reporting and UCI or CSI omission based on a linear combination codebook are proposed.

In general, and in accordance with some non-limiting exemplary effects achieved by the embodiments herein include angular and delay information and/or Doppler information that are obtained at the gNB or at the network node from the UE via CSI reporting or feedback. Based on the downlink measurements of the CSI-RS, the UE calculates and reports a set of complex precoder coefficients for the configured antenna ports, wherein each antenna port is assumed to be associated at least with one beam and one delay and/or one Doppler component. As the UE determines a set of precoder coefficients for the configured antenna ports across a number of CSI-RS resources or a single CSI-RS resource in angle-delay-Doppler domain, the feedback overhead of the CSI report can be reduced drastically compared to the conventional Rel. 15 and Rel. 16 Type-II codebooks.

It should be noted that the term "precoding" equally means "precoder". Hence, throughout this disclosure precoding and precoder are used interchangeably.

The term 'beam' is used to denote a spatially selective/directive transmission of an outgoing signal or reception of an incoming signal which is achieved by precoding/filtering the signal at the antenna ports of the device (UE or gNB) with a particular set of coefficients. The words precoding or precoder or filtering may refer to processing of the signal in the analog domain or in the digital domain. The set of coefficients used to spatially direct a transmission/reception in a certain direction may differ from one direction to another direction. The term 'Tx beam' denotes a spatially selective/directive transmission and the term 'Rx beam' denotes a spatially selective/directive reception. The set of coefficients used to precode/filter the transmission or reception is denoted by the term 'spatial filter'. The term 'spatial filter' is used interchangeably with the term 'beam direction' in this document as the spatial filter coefficients determine the direction in which a transmission/reception is spatially directed to.

Figure 2:
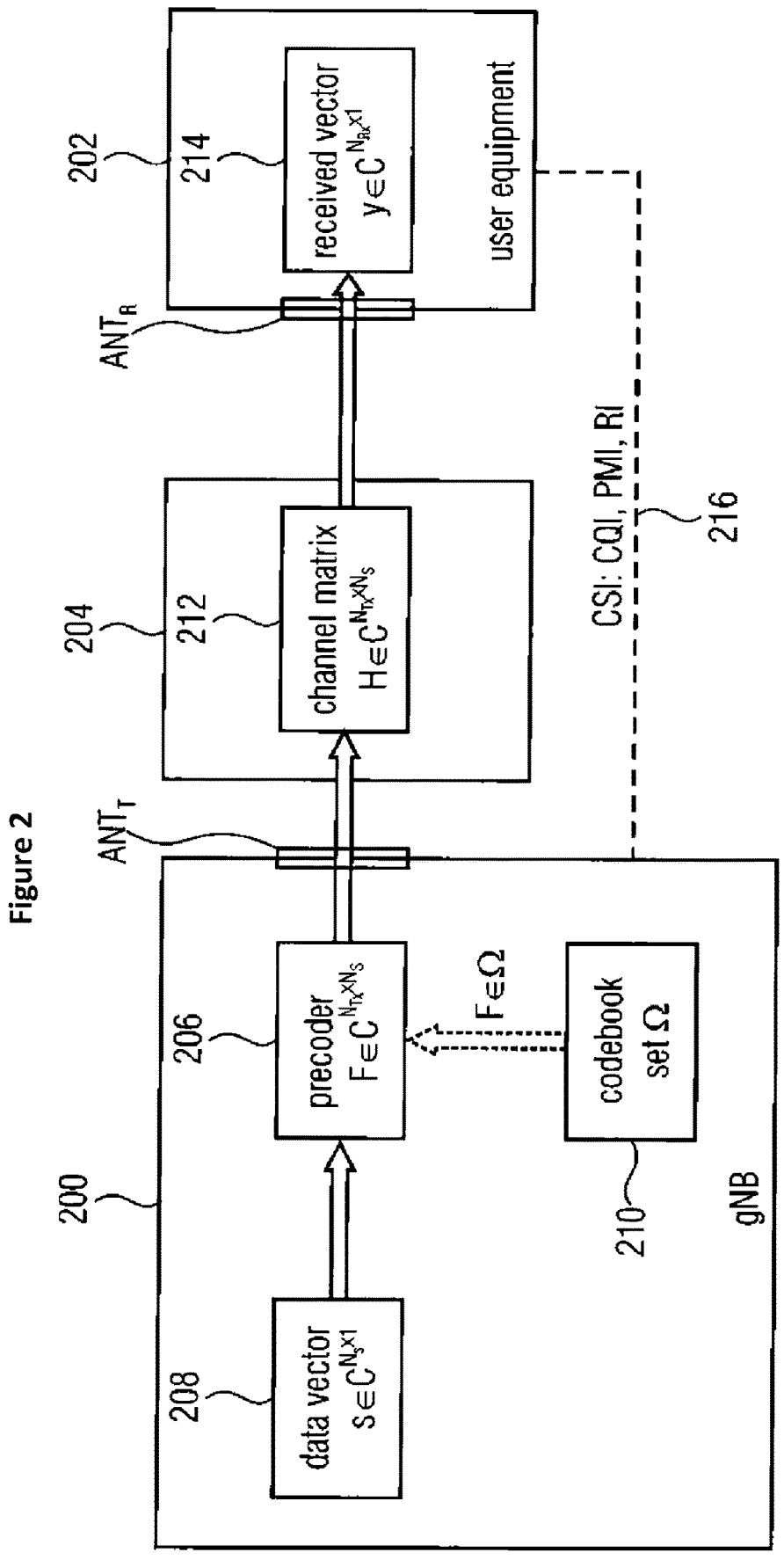
FIG. 2 shows a block-based model of a MIMO DL transmission using codebook-based-precoding in accordance with LTE release 8.

Exemplary embodiments of the present invention may be implemented in a wireless communications system or network as depicted in FIG. 1 or FIG. 2 including transmitters or transceivers, like base stations, and communication devices (receivers) or users, like mobile or stationary terminals or IoT devices or UEs, as mentioned earlier in the background part of this disclosure.

Figure 3:
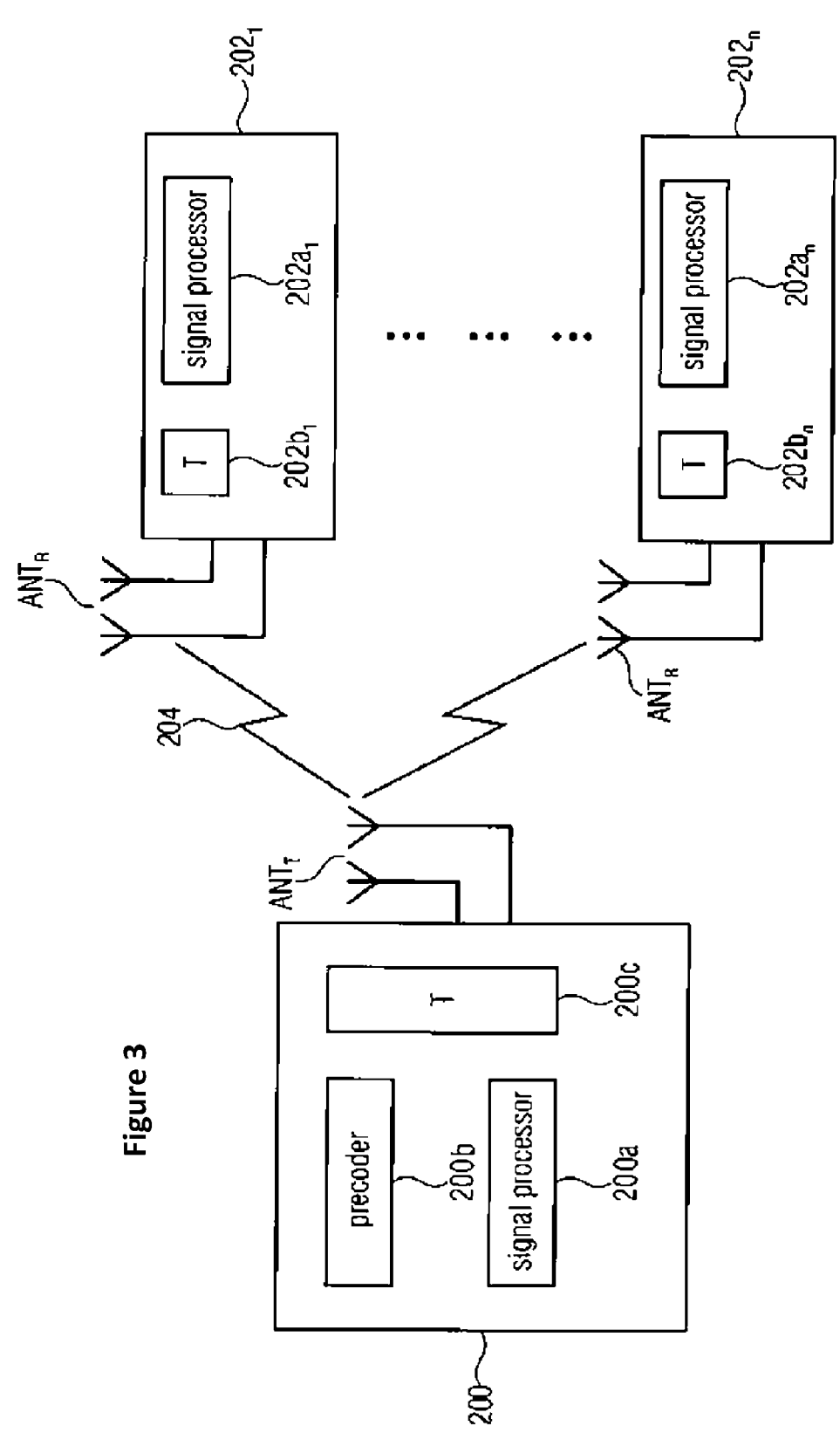
FIG. 3 is a schematic representation of a wireless communication system for communicating information between a transmitter, which may operate in accordance with the inventive teachings described herein, and a plurality of receivers, which may operate in accordance with the inventive teachings described herein.

Referring to FIG. 3, there is depicted a schematic representation of a wireless communications system for communicating information between a transmitter 200, like a base station or a gNB, and a plurality of communication devices 202$_1$ to 202$_n$, like UEs, which are served by the base station 200. The base station 200 and the UEs 202 may communicate via a wireless communication link or channel 204, like a radio link. The base station 200 includes one or more antennas ANT$_T$ or an antenna array having a plurality of antenna elements, and a signal processor 200a. The UEs 202 include one or more antennas ANT$_R$ or an antenna array having a plurality of antennas, a signal processor 202a$_1$, 202a$_n$, and a transceiver 202b$_1$, 202b$_n$. The base station 200 and the respective UEs 202 may operate in accordance with the inventive teachings described herein.

According to embodiments herein, the UE is configured to generate a CSI report about a channel between the UE and a radio base station or gNB or similarly between a transmitter and a receiver in a wireless communications system. The channel may be a MIMO channel.

The transmitter and/or the receiver mentioned above may include one or more of the following: a UE, or a mobile terminal, or a stationary terminal, or a cellular IoT-UE, or a vehicular UE, or a vehicular group leader (GL) UE, or an IoT, or a narrowband IoT, NB-IoT, device, or a WiFi non Access Point STAtion, non-AP STA, e.g., 802.11ax or 802.11be, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, or a macro cell base station, or a small cell base station, or a central unit of a base station, or a distributed unit of a base station, or a relay, or a remote radio head, or an AMF, or an SMF, or a core network entity, or mobile edge computing entity, or a network slice as in the NR or 5G core context, or any transmission/reception point, TRP, enabling an item or a device to communicate using the wireless communication network, the item or device being provided with network connectivity to communicate using the wireless communication network. A receiver may be a network node or gNB or a base station. Vice versa, a transmitter may be viewed as a radio base station or a network node or gNB, whereas a receiver may be a UE.

Uplink control information, UCI, omission occurs when the uplink resources provided by a base station or by a network node to the user equipment for an uplink transmission is not sufficient to carry the entire content of one or more CSI report(s). The CSI payload of a CSI report can be controlled by the UE by the number of precoder coefficients to be reported. In case of UCI or CSI omission, the UE can simply reduce the number of precoder coefficients to be reported for one or more of the CSI reports based on the available uplink resources (e.g., available PUSCH resources). However, such a reduction of the number of precoder combining coefficients would require a recalculation of the precoder coefficients, all basis vectors associated with the precoder vector or matrix for the one or more CSI reports, occupying additional UE resources. Such additional UE resources may not be available at the UE. Therefore, a UCI omission scheme should not require a recalculation of precoder vector or matrix for the one or more CSI reports.

In the following, the main steps performed by a UE respectively steps performed by a network node are presented followed by detailed embodiments of the present disclosure.

FIG. 4 illustrates the main steps performed by the UE for generating (and transmitting or reporting) a CSI report to a network node (base station) in a wireless communications network in according to embodiments herein. The steps performed by the UE may be defined as a codebook-based precoder structure. The steps performed by the UE comprises:

Step 401: receiving from the network node a CSI report configuration;

As an example, the UE is provided, from a network node with a CSI report configuration via a higher layer (e.g., RRC), the CSI report configuration indicating a number of antenna ports or CSI-RS ports. An antenna port, or simply port, is a CSI-RS port. In the following, antenna port, port and CSI-RS port are interchangeably used. The one or more antenna ports are associated with one or more reference signals. As an example, the UE (or the receiver) is configured to receive a radio signal via a MI MO channel, wherein the radio signal includes one or more reference signals, such as one or more CSI-RS signal(s), which are associated with the antenna ports.

Step 402: determining based on the received CSI report configuration information a number of precoder coefficients for RI transmission layers of a precoder vector or matrix;

According to an exemplary embodiment, the receiver or the UE determines for each transmission layer a precoding vector or a precoder matrix based on the received radio signal, wherein the precoding vector or the precoding matrix to be used at the transmitter (such as a network node) so as to achieve a predefined property for a communication over the MIMO channel. The precoding vector or matrix for each transmission layer is determined based on the received reference signal(s) and is based on at least one, first, basis set, and a number of precoder coefficients for combining selected basis vectors from the at least one, first, basis set. In one option, the precoding vector or matrix for each transmission layer is determined based on the received reference signal(s) and is based on a single (first) basis set, and a number of precoder coefficients for combining selected basis vectors from the basis set. In another option, the precoding vector or matrix for each transmission layer is determined based on the received reference signal(s) and is based on a first basis set and a second basis set, and a number of precoder coefficients for combining selected basis vectors from the first and second basis sets. In yet another option, the precoding vector or matrix for each transmission layer is determined based on the received reference signal(s) and is based on a first basis set and a second basis set and a third basis set and a number of precoder coefficients for combining selected basis vectors from the first, second and third basis sets.

Step 403: grouping the precoder coefficients of the RI layers into at least two coefficient subsets, each coefficient subset comprising one or more precoder coefficients;

According to an exemplary embodiment, each precoder coefficient is associated with at least two indices (l, p), where the first index, l, is a layer index, and the second index, p, is a port index and the precoder coefficients for the RI layers of the precoding vector or matrix are grouped in the CSI report into a number of non-overlapping coefficient subsets, $A=\{A_0, A_1, \ldots A_{N-1}\}$, wherein each coefficient subset $A_i$ comprises precoder coefficients of RI layers associated with a number of port indices.

Step 404: assigning an ordering to the plurality of coefficient subsets, i.e., to the two or more coefficient subsets, and an ordering to the one or more precoder coefficients within each subset;

Step 405: dividing the plurality of coefficient subsets into two or more CSI groups having associated priority levels;

According to an exemplary embodiment, an ordering to the plurality of coefficient subsets, i.e., to the two or more coefficient subsets, and an ordering to the one or more precoder coefficients within each subset is assigned. The plurality of coefficient subsets are ordered with respect to the ordering and the precoder coefficients within each subset are ordered with respect to the ordering. The plurality of coefficient subsets are divided or segmented into two or more CSI groups, wherein each CSI report and each CSI group is associated with a priority level. In some examples, the ordering of the coefficient subsets in a CSI report is with respect to an increasing coefficient subset index.

Step 406: generating a CSI report comprising CSI part 1 and CSI part 2, wherein CSI part 1 has a fixed payload size and comprises information indicating the size of the payload of CSI part 2, wherein CSI part 2 includes the precoder coefficients of at least one of the two or more CSI groups;

According to an exemplary embodiment, a CSI report contains the selected precoding vector or matrix in the form of a precoding matrix identifier, PMI, and a rank identifier or rank index, RI, indicating the transmission rank for the RI layers of the precoding vector or matrix, and each CSI report comprises two parts: CSI part 1 and CSI part 2, where CSI part 1 has a fixed payload size and comprises information indicating the size of the payload of CSI part 2. CSI part 2 comprises at least the amplitude and phase information of selected precoder coefficients of at least one of the two or more CSI groups of the CSI report.

Step 407: transmitting or reporting an uplink control information (UCI) including the one or more CSI report(s) over an uplink (UL) channel to the network node or to the gNB.

Hence, the receiver (or UE) generates one or more CSI reports, a CSI report comprising at least one of the two or more CSI groups that include the precoder coefficients of the precoding vector or matrix, and the receiver reports a feedback in the form of the one or more CSI report(s) over an uplink channel to the transmitter. The feedback indicates the precoding vector or precoder matrix for each transmission layer determined by the receiver (or the UE).

According to another exemplary embodiment, a method performed by a UE is provided, the method comprising:

receiving from the network node a radio signal via a MIMO channel. The radio signal includes the CSI-RS signal(s) according to one or more CSI-RS resource configuration(s). The CSI-RS signal(s) is/are provided over a configured number of frequency (and/or time) domain resources, and one or more antenna port(s) or one or more CSI-RS port(s);

determining based on the CSI report configuration, a number of precoder coefficients for RI transmission layers of a precoder vector or matrix, grouping the precoder coefficients of the RI layers into at least two coefficient subsets, each coefficient subset comprising one or more precoder coefficients, assigning an ordering to the plurality of coefficient subsets and an ordering to the one or more precoder coefficients within each subset, dividing the plurality of coefficient subsets into two or more CSI groups having associated priority levels, generating a CSI report comprising CSI part 1 and CSI part 2, wherein CSI part 1 has a fixed payload size and comprises information indicating the size of the payload of CSI part 2, wherein CSI part 2 includes the precoder coefficients of at least one of the two or more CSI groups, and transmitting or reporting an uplink control information (UCI) including the one or more CSI report(s) over an UL channel to the network node.

In the following embodiments, it is assumed that the resources of each CSI-RS or antenna port are precoded or beamformed at the network node, or base station, in the space domain and in the delay domain and/or in the Doppler domain. Hence, the precoder used for CSI reporting at the UE is based on a codebook that utilizes the property of angle and delay and/or Doppler reciprocity between the uplink and downlink channels. However, the following embodiments including the precoder formulations are also valid for non-precoded/non-beamformed antenna ports or CSI-RS at the network node, or base station, in the space domain and in the delay domain and/or in the Doppler domain.

Precoder Formulations for CSI Reporting

In the following option 1, the precoder is based on a single codebook or basis set, and a number of precoder or combining coefficients used for combining selected basis vectors from the codebook or basis set. Each basis vector is either associated with the full set of frequency and time domain resources of a CSI-RS or antenna port or with a proper subset of the frequency and time domain resources of a CSI-RS or antenna port used by UE for CSI measurements. In some examples, each basis vector is associated with the full set of frequency and time domain resources of a CSI-RS or antenna port. In such cases, the total number of basis vectors in the codebook or basis set defines the number of CSI-RS or antenna ports used by the UE for CSI measurements.

Option 1: Precoder Structure Based on a Single Basis Set

In accordance with embodiments, the precoding vector for a transmission layer is based on P' basis vectors selected from a first basis set comprising P basis vectors, wherein P'<P or P'≤P or P'=P, and a set of precoder coefficients for combining the selected basis vectors from the first basis sets. In some examples, as explained above, the resources are associated with a number $P_{CSI-RS}$ of CSI-RS or antenna ports. In some examples, as explained above, the resources may be associated with $P_{CSI-RS}$ CSI-RS or antenna ports, such that $P>P_{CSI-RS}$. In such cases, at least one basis vector of the first basis set may be associated with a proper subset of the resources of a CSI-RS or antenna port. The precoding vector or matrix $W^l$ for the 1-th transmission layer is defined by $$W^l = W_{1,l}W_{2,l}, \text{ or}$$

$$W^l = \sum_{p=0}^{P'-1} c_{l,p}b_{l,p}, \text{ or}$$

$$W^l = \begin{bmatrix} \sum_{p=0}^{P'-1} c_{l,p}b_{1,l,p} \\ \sum_{p=P'}^{2P'-1} c_{l,p}b_{2,l,p} \end{bmatrix},$$

where $W_{1,l}$ is a matrix comprising P' selected basis vectors from the first basis set, $W_{2,l}$ is a coefficient matrix, $b_{l,p}$ is a P×1 basis vector selected from the first basis set, $b_{1,l,p}$ is a P×1 basis vector selected from the first basis set and associated with a first polarization of the antenna ports, $b_{2,l,p}$ is a P×1 basis vector selected from the first basis set and associated with a second polarization of the antenna ports, and $c_{l,p}$ is a complex precoder coefficient or combining coefficient.

In accordance with embodiments, each basis vector of the first basis set is of size P×1 and defined by the all-zero vector except a single element which is one. The first basis set is defined by P×P identity matrix. The parameter P may be configured or indicated from a network node to the user equipment via a higher layer. P may take any suitable value and is an integer value.

In accordance with an embodiment, the CSI report configuration comprises a parameter $P_{CSI-RS}$ indicating a number of CSI-RS or antenna ports. The UE is configured to perform channel measurements on the $P_{CSI-RS}$ antenna ports and to determine the precoder vector or matrix for RI transmission layers and to indicate the precoder vector or matrix for RI transmission layers in the CSI report.

In accordance with an embodiment, the parameter P may be dependent on the configured number of CSI-RS or antenna ports, $P_{CSI-RS}$. In an exemplary embodiment, $P=P_{CSI-RS}$ and each basis vector from the first basis set is associated with a single antenna port. In an exemplary embodiment, $P=P_{CSI-RS}/2$ and each basis vector from the first basis set is associated with two antenna ports, wherein the two antenna ports are associated with two different polarizations. In some examples, $P_{CSI-RS}/2$ antenna ports are associated with a first polarization, and $P_{CSI-RS}/2$ antenna ports are associated with a second polarization.

The precoding vector or matrix for each transmission layer is based on P' selected basis vectors from the first basis set, wherein the selection is polarization-common when each vector of the first basis set is associated with the resources of two antenna ports of different polarizations and the selection is polarization-independent when each vector of the first basis set is associated with the resources of a single antenna port.

In accordance with an embodiment, each precoding vector or matrix indicated in the CSI report is defined over a number of frequency units/PRBs or frequency domain sub-bands and spatial units (e.g., with respect to a number of CSI-RS or antenna ports $P_{CSI-RS}$).

In accordance with an embodiment, the columns of the precoding vector or matrix $W^l$ for l=0, . . . , v−1 are normalized to norm one, wherein v denotes the overall rank of the transmission precoding vector or precoding matrix.

In the following, a high-rank CSI reporting where v≥1 is considered. Here, v denotes the rank, or simply RI value, and indicates the number of layers of the precoding matrix indicated in the CSI report. The v layers of the precoding matrix are indicated by the layer index l=0, 1, . . . , v−1.

In accordance with embodiments, each precoder coefficient (amplitude and/or phase) of the precoding vector or matrix according to option 1 of the precoder formulation is associated with a basis vector of the first basis set. Moreover, each precoder coefficient is associated with two indices (l, p), where the first index, l, is a layer index and the second index, p, is a port index, wherein p=0, . . . , P'−1 or p=0, . . . , 2P'−1. Note that when the precoder coefficient selection is polarization independent, the range of the port indices is defined by p=0, . . . , P'−1 and when the precoder coefficient selection is polarization common, the range of the port indices is defined by p=0, . . . , 2P'−1. In some examples, the precoder coefficients of a layer are stacked in a coefficient matrix $W_{2,l}$ of size P'×1 or 2P'×1. The size of $W_{2,l}$ is P'×1 when the selection of the P' selected basis vectors of the first basis set is polarization-independent, and the size is of $W_{2,l}$ is 2P'×1 when the selection of the P' selected basis vectors of the first basis set is polarization-common.

Note that in some examples the number of ports P' may depend on a layer index and may be different for different layers of the precoder vector or matrix. In such case, the parameter P' used above shall be replaced by $$P'_l,$$

wherein $$P'_l$$

denotes the number of selected basis vectors from the first basis set for layer index l. The number of basis vectors per layer can be configured to the UE via a higher layer (e.g., via the CSI report configuration), or it can be selected by the UE and reported (as a part of the CSI report) implicitly or explicitly to the base station or network node.

In an exemplary embodiment, when the antenna ports or CSI-RS ports are not precoded or not beamformed, the first basis set is given by a 2D-DFT matrix instead of an identity matrix and each selected vector $b_{l,p}$ from the first basis set may be alternatively referred to as a spatial beam or spatial beam vector.

In an exemplary embodiment, when the antenna ports or CSI-RS ports are not precoded or not beamformed, the number of selected spatial beam vectors, or simply vectors, $b_{l,p}$, from the first basis set per polarization of the antenna ports or CSI-RS ports is either $$\frac{L}{2}$$

or L.

In the following option 2, the precoder is based on a number of basis vectors and a number of precoder or combining coefficients for combining the basis vectors from two basis sets. The basis vectors are selected from a first basis set and from a second basis set. Each basis vector of the first basis set is associated with all frequency and time domain resources or with a proper subset of the frequency and time domain resources of a CSI-RS or antenna port.

Each basis vector of the second basis set is associated with a number of frequency domain subbands, physical resource blocks (PRBs) or precoder units $N_3$.

Option 2: Precoder Structure Based on Two Basis Sets

In accordance with embodiments, the precoding vector for a transmission layer is based on P' basis vectors selected from a first basis set comprising P basis vectors, wherein P'<P or P'≤P or P'=P, and D' basis vectors selected from a second basis set comprising D basis vectors, wherein D'<D or D'≤D or D'=D, and a set of precoder coefficients for combining the selected basis vectors from the first and second basis sets.

The precoding or precoder vector or precoding matrix for each transmission layer is based on P' selected basis vectors from the first basis set, wherein the selection is polarization-common when each vector of the second basis set is associated with two antenna ports of different polarizations, and polarization-independent when each vector of the first basis set is associated with a single antenna port.

In an exemplary embodiment, for option 2 of the precoder formulation the number of basis vectors P' selected from the first basis set depends on the layer index and can be different across the RI layers of the precoder vector or matrix. In such cases, the parameter P' used above shall be replaced by $$P'_l,$$

wherein $$P'_l$$

denotes the number of selected basis vectors from the first basis set for layer index l. The number of basis vectors per layer can be configured to the UE via a higher layer (e.g., via the CSI report configuration), or it can be selected by the UE and reported (as a part of the CSI report) implicitly or explicitly to the base station or network node.

In accordance with an embodiment, each precoding vector or matrix indicated in the CSI report is defined over a number of frequency units/PRBs or frequency domain subbands (e.g., with respect to a number of subbands $N_3$) and spatial units (e.g., with respect to a number of CSI-RS or antenna ports $P_{CSI-RS}$).

In accordance with an embodiment, each basis vector from the second basis set is defined by an DFT-vector or IDFT-vector of size $N_3$×1. Each DFT or IDFT vector defines a linear phase shift over $N_3$ subbands or PRBs or frequency units and hence is associated in the transformed (delay or time) domain with a delay value. The second basis set may comprise D basis vectors and is a subset of a basis set comprising $N_3$ DFT- or IDFT-based vectors of size $N_3$×1, wherein D<$N_3$, and $N_3$ is a number of subbands or PRBs or frequency domain units/components used for CSI reporting configured to the UE or reported by the UE. D and $N_3$ may take any suitable value.

In accordance with an embodiment, the CSI report configuration received by the UE from the network node may comprise indicating the parameter D (the size of the second basis set). The basis vectors of the second basis set is a subset of a basis set comprising $N_3$ basis vectors, wherein D<$N_3$, and wherein the D basis vectors of the second basis set are given by D DFT- or IDFT-vectors of an $N_3$×$N_3$ DFT- or IDFT-based matrix $[a_0, a_1, \ldots a_{N_3-1}]$.

In accordance with an embodiment, the columns of the precoding vector or matrix $W^l$ are normalized for l=0, . . . , v−1 to norm one, wherein v denotes the overall rank of the transmission precoding vector or precoding matrix.

In the following, a high-rank CSI reporting where v≥1 is considered. Here, v denotes the rank, or simply RI value, and indicates the number of layers of the precoding matrix indicated in the CSI report. The v layers of the precoding matrix are indicated by the layer index l=0, 1, . . . , v−1.

In according with an embodiment, the precoding vector or precoding matrix for a transmission layer for each transmission layer is based on D' (D'≤D, or D'<D) or D basis vectors selected from the second basis set, P' (P'≤P, or P'<P) or P basis vectors selected from the first basis set, and a set of precoder or combining coefficients for combining the selected vectors from the first and second basis sets. The precoding vector or precoding matrix $W^l$ is defined over a number of frequency units/PRBs or frequency domain subbands ($N_3$) and spatial units (P) for the l-th transmission layer. In some examples, the precoding vector or precoding matrix $W^l$ for the l-th transmission layer may be defined by:

$$W^l = W_{1,l} W_{2,l} W_{f,l}^H, \text{ or}$$

$$W^l = \sum_{p=0}^{P'-1} \sum_{d=0}^{D-1} c_{l,p,d} \left( b_{l,p} a_{l,p,d}^H \right) = \sum_{d=0}^{D-1} \sum_{p=0}^{P'-1} c_{l,p,d} \left( b_{l,p} a_{l,p,d}^H \right), \text{ or}$$

$$W^l = \begin{bmatrix} \sum_{p=0}^{P'-1} \sum_{d=0}^{D-1} c_{l,p,d} \left( b_{l,p} a_{l,p,d}^H \right) \\ \sum_{p=P'}^{2P'-1} \sum_{d=0}^{D-1} c_{l,p,d} \left( b_{l,p} a_{l,p,d}^H \right) \end{bmatrix},$$

where
$W_{1,l}$ is a matrix comprising P' selected basis vectors from the first basis set,
$W_{2,l}$ is a coefficient matrix, $$W_{f,l}^H$$

is a matrix comprising D', D or less than D basis vectors from the second basis set,
$b_{l,p}$ is a P×1 vector from the first basis set,
$a_{l,p,d}$ is a $N_3$×1 basis vector from the second basis set, and
$c_{l,p,d}$ is a complex precoder coefficient or combining coefficient.

In accordance with embodiments, each precoder coefficient (amplitude and/or phase) of the precoding vector or matrix according to option 2 of the precoder formulation is associated with a basis vector of the first basis set and a basis vector of the second basis set. Each precoder coefficient is associated with three indices (l, p, d), where the first index, l, is a layer index, the second index, p, is a port index, wherein p=0, . . . , P'−1 or p=0, . . . , 2P'−1, and the third index, d, is a delay index, wherein d=0, . . . , D'−1. In some examples, the precoder coefficients of a layer are stacked in a coefficient matrix $W_{2,l}$ of size P'×D' or 2P'×D'. The size of $W_{2,l}$ is P'×D' when the selection of the P' basis vectors from the first basis set is polarization-independent and the size of $W_{2,l}$ is 2P'×D' when the selection of the P' basis vectors from the first basis set is polarization-common.

In an exemplary embodiment, D'=D. The second dimension of the coefficient matrix $W_{2,l}$ is then defined by the total number of basis vectors in the second basis set. Each column of the coefficient matrix is associated with a single basis vector from the second basis set.

In an exemplary embodiment, P'=P. The first dimension of the coefficient matrix $W_{2,l}$ is P or 2P. Each row of the coefficient matrix is associated with a single basis vector from the first basis set.

In an exemplary embodiment, when the antenna ports or CSI-RS ports are not precoded or not beamformed, the first basis set is given by a 2D-DFT matrix instead of an identity matrix and each selected vector $b_{l,p}$ from the first basis set may be alternatively referred to as a spatial beam or spatial beam vector.

In an exemplary embodiment, when the antenna ports or CSI-RS is not precoded or not beamformed, the number of selected vectors $b_{l,p}$ from the first basis set per polarization is given by $$\frac{L}{2}$$

or L.

Option 3: Precoder Structure Based on Three Basis Sets

In accordance with embodiments, the precoding vector for a transmission layer is based on P' basis vectors selected from a first basis set comprising P basis vectors, wherein P'<P or P'≤P or P'=P, and D' basis vectors selected from a second basis set comprising D basis vectors, wherein D'<D or D'≤D or D'=D and E' basis vectors selected from a third basis set comprising E basis vectors, wherein E'<E or E'≤E or E'=E, and a set of precoder coefficients for combining the selected basis vectors from the first and second and third basis sets.

The precoding or precoder vector or precoding matrix for each transmission layer is based on P' selected basis vectors from the first basis set, wherein the selection is polarization-common when each vector selected from the first basis set is associated with two antenna ports of different polarizations, and polarization-independent when each selected vector from the first basis set is associated with a single antenna port and polarization.

In an exemplary embodiment, the number of basis vectors P' selected from the first basis set depends on the layer index and can be different across the RI layers of the precoder vector or matrix. In such cases, the parameter P' used above shall be replaced by $$P_l',$$

wherein $$P_l'$$

denotes the number of selected basis vectors from the first basis set for layer index l. The number of basis vectors per layer can be configured to the UE via a higher layer (e.g., via the CSI report configuration), or it can be selected by the UE and reported (as a part of the CSI report) implicitly or explicitly to the base station or network node.

In accordance with an embodiment, each precoding vector or matrix indicated in the CSI report is defined over a number of frequency units/PRBs or frequency domain subbands (e.g., with respect to a number of subbands $N_3$) and spatial units (e.g., with respect to a number of CSI-RS or antenna ports $P_{CSI-RS}$).

In accordance with an embodiment, each basis vector from the second basis set is defined by an DFT-vector or IDFT-vector of size $N_3 \times 1$. Each DFT or IDFT vector defines a linear phase shift over N 3 subbands or PRBs or frequency units and hence is associated in the transformed (delay or time) domain with a delay value. The second basis set may comprise D basis vectors and is a subset of a basis set comprising $N_3$ DFT- or IDFT-based vectors (e.g., an over-sampled DFT-based matrix) of size $N_3 \times 1$, wherein $D<N_3$, and $N_3$ is a number of subbands or PRBs or frequency domain units/components used for CSI reporting configured to the UE or reported by the UE. D and $N_3$ may take any suitable value.

In accordance with an embodiment, the CSI report configuration received by the UE from the network node may comprise indicating the parameter D (the size of the second basis set). The basis vectors of the second basis set is a subset of a basis set comprising $N_3$ or $N_3Q_3$ or $N_3Q_3-1$ basis vectors, wherein $D<N_3$, and $Q_3$ denotes an oversampling factor. In some examples, the D basis vectors of the second basis set are given by D DFT- or IDFT-vectors of an $N_3 \times N_3$ DFT- or IDFT-based or rotated $N_3 \times N_3$ DFT- or IDFT-based matrix $[a_0, a_1, \ldots a_{N_3-1}]$. In some examples, the D basis vectors of the second basis set are given by D DFT- or IDFT-vectors of an oversampled $N_3 \times N_3Q_3$ or $N_3 \times N_3Q_3-1$ DFT- or IDFT-based matrix.

In accordance with an embodiment, each basis vector from the third basis set is defined by an DFT-vector or IDFT-vector of size $N_4 \times 1$. Each DFT or IDFT vector defines a linear phase shift over $N_4$ time instants and hence is associated in the transformed time domain with a Doppler value. The third basis set may comprise E basis vectors and is a subset of a basis set comprising $N_4$ or $N_4Q_4$ or $N_4Q_4-1$ DFT- or IDFT-based vectors of size $N_4 \times 1$, wherein $E<N_4$ or $E=N_4$, $N_4$ is a number of time instants/Doppler components used for CSI reporting configured to the UE or reported by the UE, and $Q_4$ is an oversampling factor E and $N_4$ may take any suitable value.

In accordance with an embodiment, the CSI report configuration received by the UE from the network node may comprise indicating the parameter E (the size of the third basis set). The basis vectors of the third basis set is a subset of a basis set comprising $N_4$ basis vectors, wherein $E<N_4$, and wherein the E basis vectors of the third basis set are given by E DFT- or IDFT-vectors of an $N_4 \times N_4$ DFT- or IDFT-based or rotated $N_4 \times N_4$ DFT- or IDFT-based matrix $[d_0, d_1, \ldots d_{N_4-1}]$. In some examples, the E basis vectors of the third basis set are given by E DFT- or IDFT-vectors of an oversampled $N_4 \times N_4Q_4$ or $N_4 \times N_4Q_4-1$ DFT- or IDFT-based matrix.

In accordance with an embodiment, the columns of the precoding vector or matrix $W^l$ are normalized for $l=0, \ldots, v-1$ to norm one, wherein v denotes the overall rank of the transmission precoding vector or precoding matrix.

In the following, a high-rank CSI reporting where $v \geq 1$ is considered. Here, v denotes the rank, or simply RI value, and indicates the number of layers of the precoding matrix indicated in the CSI report. The v layers of the precoding matrix are indicated by the layer index $l=0, 1, \ldots, v-1$.

In according with an embodiment, the precoding vector or precoding matrix for a transmission layer for each transmission layer is based on D' ($D' \leq D$, or $D'<D$) or D basis vectors selected from the second basis set and/or E' ($E' \leq E$, or $E'<E$) or E basis vectors selected from the third basis set, P' ($P' \leq P$, or $P'<P$) or P basis vectors selected from the first basis set, and a set of precoder or combining coefficients for combining the selected vectors from the first and second and/or third basis sets. The precoding vector or precoding matrix $W^l$ is defined over a number of frequency units/PRBs or frequency domain subbands ($N_3$) and/or over a number of time instances ($N_4$) and spatial units (P) for the l-th transmission layer. In some examples, the precoding vector or precoding matrix $W^{l,t}$ for the l-th transmission layer and t-th time instant may be defined by:

$$W^{l,t} = \sum_{p=0}^{P'-1} b_{l,p} \sum_{d=0}^{D-1} \sum_{n=0}^{E-1} \left( c_{l,p,d,n} a_{l,p,d}^H x_{l,p,d,n,t} \right) \text{ or}$$

$$W^{l,t} = \begin{bmatrix} \sum_{p=0}^{P'-1} b_{l,p} \sum_{d=0}^{D-1} \sum_{n=0}^{E-1} \left( c_{l,p,d,n} a_{l,p,d}^H x_{l,p,d,n,t} \right) \\ \sum_{p=P'}^{2P'-1} b_{l,p} \sum_{d=0}^{D-1} \sum_{n=0}^{E-1} \left( c_{l,p,d,n} a_{l,p,d}^H x_{l,p,d,n,t} \right) \end{bmatrix},$$

where
$b_{l,p}$ is a $P \times 1$ vector from the first basis set,
$a_{l,p,d}$ is a $N_3 \times 1$ basis vector from the second basis set, $$x_{l,p,d,n,t} = e^{\sqrt{-1} \frac{2\pi t n_{4,l,p,d}}{N_4}} \text{ or } x_{l,p,d,n,t} = e^{-\sqrt{-1} \frac{2\pi t n_{4,l,p,d}}{N_4}}$$

is the t-th ($t=0, 1, \ldots, N_4-1$) component/entry of the $n_{4,l,p,d}$-th basis vector/time-domain component selected from the third basis set,
and
$c_{l,p,d,n}$ is a complex precoder coefficient or combining coefficient.

In an exemplary embodiment, the number of selected delays D' or D is equal to the number of Doppler components E' or E.

In accordance with embodiments, each precoder coefficient (amplitude and/or phase) of the precoding vector or matrix according to option 3 of the precoder formulation is associated with a basis vector of the first basis set, a basis vector of the second basis set, and a basis vector of the third basis set. Each precoder coefficient is associated with four indices (l, p, d, n), where the first index, l, is a layer index, the second index, p, is a port index, wherein $p=0, \ldots, P'-1$ or $p=0, \ldots, 2P'-1$, the third index, d, is a delay index, wherein $d=0, \ldots, D'-1$ and the fourth index, n, is a Doppler component index, wherein $n=0, \ldots, E'-1$.

In an exemplary embodiment, for D' selected delays and E' Doppler components, the number of precoder coefficients for each spatial beam or selected CSI-RS or antenna port is either D' or E', and each precoder coefficient is associated with a delay and Doppler index pair (d,n). Hereafter, for simplicity, the precoder coefficient $c_{l,p,d,n}$ is denoted by $c_{l,p,d}$, wherein d denotes a delay and/or a Doppler index or delay and Doppler index pair.

In the following embodiments, it is assumed that the number of delays and Doppler components for each beam-formed or non-beamformed CSI-RS or antenna port is given by D'.

In some examples, the precoder coefficients of a layer are stacked in a coefficient matrix $W_{2,l}$ of size $P' \times D'$ or $2P' \times D'$. The size of $W_{2,l}$ is $P' \times D'$ when the selection of the P' basis vectors from the first basis set is polarization-independent and the size of $W_{2,l}$ is $2P' \times D'$ when the selection of the P' basis vectors from the first basis set is polarization-common.

In an exemplary embodiment, $D'=D$. The second dimension of the coefficient matrix $W_{2,l}$ is then defined by the total number of basis vectors in the second basis set. Each column of the coefficient matrix is associated with a single basis vector from the second basis set.

In an exemplary embodiment, P'=P. The first dimension of the coefficient matrix $W_{2,l}$ is P or 2P. Each row of the coefficient matrix is associated with a single basis vector from the first basis set.

In an exemplary embodiment, for option 1 and option 2 and option 3 of the precoder formulations the number of basis vectors P' selected from the first basis set depends on the layer index and can be different across the RI layers of the precoder vector or matrix. In such cases, $$P'_l$$

represents the number of basis vectors for the l-th layer. The number of basis vectors per layer can be configured to the UE via a higher layer (e.g., via the CSI report configuration) or it can be selected by the UE and reported implicitly or explicitly to the base station or network node.

Number of Subbands:

In accordance with an embodiment, the UE is configured to determine the dimension of the first basis set N 3 based on the higher layer configuration parameter, number of CQI subbands $N_{CQI}$ as $N_3 = \lceil QN_{CQI} \rceil$, where $Q \geq 1$ and Q is indicated in the CSI report by the UE.

In accordance with an embodiment, the UE is configured to determine the dimension of the first basis set $N_3$ based on the parameter Q and number of CQI subbands $N_{CQI}$ as $N_3 = \lceil Q \cdot N_{CQI} \rceil$, wherein the parameter Q is higher layer configured to the UE or known to the UE, e.g., fixed in the NR specification.

UCI Omission

In accordance with embodiments, the uplink resource or uplink control information (UCI) may contain the one or more reduced-size CSI report(s), wherein the UCI may comprise a UCI or CSI part 1 and a UCI or CSI part 2. In some examples, the UCI or CSI part 1 may comprise an indication of the number of precoder (amplitude and/or phase) coefficients per layer or across all layers of the precoder vector or matrix for the one or more CSI report(s). In some examples, the UCI or CSI part 1 may comprise a rank indication or a rank index (RI) for the one or more CSI report(s) indicating the number of layers of the precoder vector or matrix in the CSI report.

In accordance with embodiments, the UE is configured to receive an uplink resource allocation from a base station for an uplink transmission of one or more CSI reports. The UE may determine that the size of the resource allocation is not sufficient to carry the entire content(s) of the CSI report(s). In such cases, the UE may perform a CSI or UCI omission procedure to determine one or more reduced-size CSI report(s) that fit within the uplink resource allocation. The one or more reduced-size CSI report(s) may be transmitted over an uplink channel to a base station.

In one embodiment, the CSI omission procedure is based on dropping a portion of the amplitude and phase coefficients of the precoder or combining coefficients of the one or more CSI report(s). This means the UE is configured to omit a portion of the one or more CSI report(s), and thereby provide one or more reduced-size CSI report(s) for the transmission over an uplink channel to a base station.

In accordance with embodiments, the plurality of coefficient subsets comprising combining or precoder coefficients are segmented for each CSI report into two or more CSI groups for CSI omission, wherein for the coefficient subsets and the precoder coefficients a certain ordering is applied and the coefficient subsets are segmented or divided into two or more CSI groups. Moreover, each CSI report and each CSI group may be associated with a priority level.

In one embodiment, the CSI or UCI omission procedure is based on dropping one or more CSI groups and hence the associated phase and amplitude coefficients of the precoder vector or matrix of the associated CSI report according to a priority rule. Hence, in case of CSI or UCI omission, a part of the amplitude and/or phase coefficients of the precoder vector or matrix indicated in the CSI report is omitted.

In accordance with embodiments, the UE may drop the CSI groups in case of UCI or CSI omission with lower priority until the payload size of the CSI report(s) fits with the resource allocation from the base station. When omitting a CSI group for a particular priority level, the UE may omit all the CSI content at that priority level.

Non-Zero Precoder Coefficient Reporting

In order to reduce signaling overhead for reporting the precoder coefficients, only a subset or proper subset of the P'×1- or 2P'×1 or P'×D'- or 2P'×D'-sized precoder vector or matrix may be reported and hence indicated in the CSI report, wherein the remaining precoder coefficients are assumed to be (or set to) zero and not reported. The subset of precoder coefficient comprising $K_{NZ}$ non-zero coefficients to be reported may be referred to as the non-zero coefficients in the following. In addition, the CSI report may comprise an indicator for indicating the location of the non-zero coefficients in the coefficient matrix. In some examples, such an indicator is given by a bitmap of size P'×1 or 2P'×1 or P'×D' or 2P'×D', wherein each bit is associated with a precoder coefficient in the coefficient matrix, $W_{2,l}$. When a bit in the bitmap is set to '1' the associated precoder coefficient is reported and when a bit in the bitmap is set to '0' the associated precoder coefficient is not reported and treated as zero.

Hereafter, the embodiments are presented for a port-selection codebook assuming precoded or beamformed CSI-RS or antenna ports and hence the number of selected ports is denoted by P' or 2P'. However, the following embodiments are also valid for a linear combination codebook assuming non-precoded or non-beamformed CSI-RS or antenna ports and in this case, the number of selected ports (P') or (2P') shall be replaced by the number of spatial beams (L) or (2L).

For non-precoded or non-beamformed antenna ports or CSI-RS, in order to reduce signaling overhead for reporting the precoder coefficients, only a subset or proper subset of the L×1- or 2L×1 or L×D'- or 2L×D'-sized precoder vector or matrix may be reported and hence indicated in the CSI report, wherein the remaining precoder coefficients are assumed to be (or set to) zero and not reported. The subset of precoder coefficient comprising $K_{NZ}$ non-zero coefficients to be reported may be referred to as the non-zero coefficients in the following. In addition, the CSI report may comprise an indicator for indicating the location of the non-zero coefficients in the coefficient matrix such an indicator is given by a bitmap of size L×1 or 2L×1 or L×D' or 2L×D', wherein each bit is associated with a precoder coefficient in the coefficient matrix, $W_{2,l}$. When a bit in the bitmap is set to '1' the associated precoder coefficient is reported and when a bit in the bitmap is set to '0' the associated precoder coefficient is not reported and treated as zero.

The precoder coefficients per layer are normalized such that the amplitude and phase of the strongest precoder coefficient per layer is equal to 1 and 0, respectively. In that case, the strongest precoder coefficient need not be reported as the amplitude and phase are given by 1 and 0, respectively. The UE may indicate in the CSI report, the row and column index or the row index or the column index of coefficient matrix, $W_{2,l}$ associated with the strongest coefficient.

In accordance with embodiments, the UE may be configured to indicate the row and column index or only the row index or only the column index of coefficient matrix $W_{2,l}$ associated with the strongest coefficient per layer in the CSI report.

Therefore, the number of non-zero coefficients per layer that are reported in the CSI report is given by $K_{NZ,l}-1$, and the total number of non-zero coefficients that are reported in the CSI report across all layers is given by $\Sigma_l K_{NZ,l}-RI$.

In accordance with embodiments, for option 1 of the precoder formulation, the CSI report comprises reporting of $K_{NZ,l}$ or $K_{NZ,l}-1$ non-zero precoder coefficients out of P' or 2P' precoder coefficients per layer, wherein $K_{NZ,l}$ denotes the number of non-zero precoder coefficients per layer, and wherein the total number of non-zero precoder coefficients across all layers is given by $K_{NZ}=\Sigma_l K_{NZ,l}$.

In accordance with embodiments, for option 2 of the precoder formulation, the CSI report comprises reporting of $K_{NZ,l}$ or $K_{NZ,l}-1$ non-zero precoder coefficients out of P'D' or 2P'D' precoder coefficients per layer, wherein $K_{NZ,l}$ denotes the number of non-zero precoder coefficients per layer, and wherein the total number of non-zero precoder coefficients across all layers is given by $K_{NZ}=\Sigma_l K_{NZ,l}$.

In accordance with embodiments, for option 3 of the precoder formulation, the CSI report comprises reporting of $K_{NZ,l}$ or $K_{NZ,l}-1$ non-zero precoder coefficients out of P'D' or 2P'D' precoder coefficients per layer, wherein $K_{NZ,l}$ denotes the number of non-zero precoder coefficients per layer, and wherein the total number of non-zero precoder coefficients across all layers is given by $K_{NZ}=\Sigma_l K_{NZ,l}$.

In accordance with embodiments, the bits in the bitmap (if present in the CSI report) are ordered in the same way as the coefficient subsets and the precoder coefficients in the coefficient subsets.

In the current NR specification, the maximum number of supported CSI-RS ports is 32. According to the aforementioned precoder formulation for option 1 and option 2, the precoder coefficient matrix for each layer is of size P'×1 or 2P'×1 and P'×D' or 2P'×D', respectively. As the value of P' is typically higher than the value of D' (if present) and RI, the precoder coefficients associated with a subset of P' or 2P' port indices (rows) of all D' delay and/or Doppler indices (if present) may be sufficient to achieve a satisfactory performance in the event of CSI omission. Therefore, the precoder coefficients associated with a subset or a proper subset of P' or 2P' or $$P'_l$$

port indices (rows) are grouped into a number of coefficient subsets and in the event of a CSI or UCI omission, some or all precoder coefficients associated with the coefficient subset(s) can be dropped or discarded sequentially starting from the last coefficient subset N−1. The ordering of the precoder coefficient subsets as well as the precoder coefficients of each coefficient subset greatly influences the performance of the precoder as all or some coefficients associated with a layer(s) can be dropped resulting in a performance loss. Therefore, specific ordering schemes for the ordering of the coefficient subsets as well as the precoder coefficients of each coefficient subset are needed to reduce the performance loss in the event of omission. In the following, several ordering schemes for the coefficient subsets and precoder coefficients are described in detail.

Grouping Schemes of Precoder Coefficients in the CSI Report (Option 1 of the Precoder Formulation)

In accordance with an embodiment, each precoder coefficient in a coefficient subset is associated with at least two indices (l, p), wherein a first index, l=0, . . . , RI−1, is a layer index and a second index, $p \in U$, is a port index, wherein U={0, . . . , P'−1} or U={0, . . . , 2P'−1} is the set of port indices. When the selection of the precoding coefficients is polarization-independent, the set U comprises P' port indices and is defined by U={0, . . . , P'−1}. Here, a precoder coefficient associated with port index $p \in U$ is either associated with a first or second polarization of an antenna port. When the selection of the precoding coefficients is polarization-common, the set U comprises 2P' port indices and is defined by U={0, . . . , 2P'−1}. Here, a precoder coefficient associated with port index $p \in \{0, . . . , P'−1\}$ is associated with a first polarization of an antenna port, and a precoder coefficient associated with port index p+P' is associated with a second polarization of the same antenna port. Hence, the precoder coefficients associated with port indices {0, . . . , P'−1} are associated with a first polarization of the antenna ports and precoder coefficients associated with port indices {P', . . . , 2P'−1} are associated with a second polarization of the antenna ports.

In accordance with an embodiment S1, the precoder coefficients for the RI layers of the precoding vector or matrix are grouped in the CSI report into a number of non-overlapping coefficient subsets, A={$A_0, A_1, . . . , A_{N-1}$}, wherein each coefficient subset $A_i$ comprises precoder coefficients of RI layers associated with a number of port indices. The precoder coefficients of the l-th layer of a coefficient subset are associated with one subset of continuous port indices from U or two subsets of continuous port indices from U.

In accordance with embodiments, the first coefficient subset may comprise precoder coefficients associated with two polarizations of the antenna ports.

In accordance with embodiments, each coefficient subset may comprise precoder coefficients associated with two polarizations of the antenna ports.

In accordance with embodiments, the i-th coefficient subset comprises a subset of the precoder coefficients of the RI layers, wherein the precoder coefficients of the l-th layer are associated with $B_{i,l}$ port indices (or less than $B_{i,l}$ port indices), wherein the $B_{i,l}$ port indices are defined by a subset of continuous port indices from U or the $B_{i,l}$ port indices are defined by two subsets of continuous port indices from U.

In some examples, the number of port indices $B_{i,l}$ per coefficient subset may be identical for the RI layers.

In some examples, the number of port indices $B_{i,l}$ is identical for all coefficient subsets $A_i$. In some examples, the number of port indices $B_{i,l}$ is non-identical over the coefficient subsets $A_i$.

In some examples, the coefficient subsets {$A_0, A_1, . . . , A_{N-1}$} are ordered in the CSI report with respect to an increasing subset index.

In an exemplary embodiment, there are 2P' precoder coefficients, wherein P' precoder coefficients are associated with a first polarization of the antenna ports, and P' precoder coefficients are associated with a second polarization of the antenna ports. The precoder coefficients of the RI layers are grouped into two non-overlapping coefficient subsets (N=2) in the CSI report. The first coefficient subset $A_0$ comprises the precoder coefficients of all RI layer indices associated with the first $$\frac{P'}{2}$$

port indices of a first polarization (p=0 . . . P'/2−1) of the antenna ports, and the precoder coefficients of all RI layer indices associated with the first P'/2 port indices of a second polarization $$\left(p = P' + 0, \ ... \ , P' + \frac{P'}{2} - 1\right)$$

or the antenna ports. The second coefficient subset $A_1$ comprises the precoder coefficients of all RI layer indices associated with the remaining $$\frac{P'}{2}$$

port indices of the first polarization (p=P'/2 . . . , P'−1) of the antenna ports, and the precoder coefficients of all RI layer indices associated with the remaining P'/2 port indices of the second polarization (p=P'+P'/2, . . . , 2P'−1) of the antenna ports. Note that in some examples, P'=P. In some examples, the precoder selection is polarization common and RI=2 and P'=8 as shown in FIG. 5. The set U of port indices is defined by U={0, . . . , 15}. The selected port indices for layer 0 and layer 1 are {0,1,2,3,4,5,9,10,11,13,14,15} and {0,4,5,8,9,11, 13,15}, respectively. Each coefficient subset comprises precoder coefficients associated with 4 port indices of each polarization of both layers. The first coefficient subset $A_0$ comprises precoder coefficients associated with the port indices {0,1,2,3,9,10,11} and {0,8,9,11} of layer 0 and layer 1, respectively. The second coefficient subset $A_1$ comprises precoder coefficients associated with the port indices {4,5, 13,14,15} and {4,5,13,15} of layer 0 and layer 1, respectively.

Grouping of Precoder Coefficients Based on Global Port Indices

In accordance with an embodiment, each precoder coefficient in a coefficient subset is associated with two indices (l, p), wherein a first index, l=0, . . . , RI−1, is a layer index and a second index, p∈U', is a global port index, wherein U'={0, . . . , P−1} or U'={0, . . . , 2P−1} is the set of global port indices. Here, P represents the number of vectors in the first basis set.

It is assumed that a mapping between a global port index p∈U' and a local port index p∈U exists. When the selection of the precoding coefficients is polarization-independent, the set U' comprises P port indices and is defined by U'= {0, . . . , P−1}. Here, a precoder coefficient associated with port index p∈U' is either associated with a first or second polarization of an antenna port. When the selection of the precoding coefficients is polarization-common, the set U' comprises 2P global port indices and is defined by U'= {0, . . . , 2P−1}. Here, a precoder coefficient associated with global port index p∈{0, . . . , P−1} is associated with a first polarization of an antenna port, and a precoder coefficient associated with global port index p+P is associated with a second polarization of the same antenna port. (See FIG. 6).

In accordance with embodiments, the precoder coefficients are grouped into the coefficient subsets based on the (global) 2P port indices.

In one exemplary embodiment, there are 2P' or P' precoder coefficients, wherein P' precoder coefficients are associated with a first polarization of the antenna ports and P' precoder coefficients are associated with a second polarization of the antenna ports, or P' precoder coefficients are associated with a first and/or a second polarization of the antenna ports. The precoder coefficients of the RI layers are grouped into two non-overlapping coefficient subsets (N=2) in the CSI report. The first coefficient subset $A_0$ comprises the precoder coefficients of all RI layer indices associated with the first global $$\frac{P}{2}$$

port indices of a first polarization (0, . . . , P/2−1) of the antenna ports, and the precoder coefficients of all RI layer indices associated with the first global P/2 port indices of a second polarization $$\left(P + 0, \ ... \ , P + \frac{P}{2} - 1\right)$$

of the antenna ports. The second coefficient subset $A_1$ comprises the precoder coefficients of all RI layer indices associated with the remaining $$\frac{P}{2}$$

global port indices of a first polarization (P/2, . . . , P−1) of the antenna ports, and the precoder coefficients of all RI layer indices associated with the remaining P/2 global port indices of a second polarization (P+P/2, . . . , 2P−1) of the antenna ports.

In some examples, the precoder selection is polarization common and RI=2, P=8 and P'=6 as shown in FIG. 7. Here, U'={0, . . . , 15} and U={0, . . . , 11}.The selected global port indices for layer 0 and layer 1 are {0,1,2,7,8,9,11,12,15} and {0,2,4,6,7,9,13,15}, respectively, whereas according to the indexing based on P' i.e., U={0, . . . , 11}, the selected port indices for layer 0 and layer 1 are {0,1,2,5,6,7,8,9,11} and {0,2,3,4,5,7,10,11}, respectively. The first coefficient subset comprises precoding coefficients associated with the port indices {0,1,2,8,9,11} and {0,2,9} of layer 0 and layer 1, respectively and the second coefficient subset comprises precoding coefficients associated with the port indices {7,12, 13} and {4,6,7,13,15} of layer 0 and layer 1, respectively.

In an exemplary embodiment, each coefficient subset comprises $$\left\lceil \frac{P'_l}{N} \right\rceil \ \text{or} \ \left\lceil \frac{P_l}{N} \right\rceil$$

precoder coefficients per layer, wherein N is the number of coefficient subsets.

In an exemplary embodiment, the number of coefficient subsets N is equal to 2, the first coefficient subset $A_0$ comprises $$\lceil P'_l / 2 \rceil$$

precoder coefficients and the second coefficient subset $A_1$ comprises the remaining $$\lfloor P'_l / 2 \rfloor$$

precoder coefficients. In some examples, the precoder coefficients are grouped in the coefficient subsets with respect to an increasing port index.

In some examples, RI=2 and the number of precoder coefficients of layer 0 and layer 1 are $$P'_0 = 13 \text{ and } P'_1 = 9,$$

respectively. For N=2, the first coefficient subset $A_0$ comprises the first 7 and the first 5 precoder coefficients of layers 0 and 1, respectively, and the second coefficient subset $A_1$ comprises the remaining 6 and 4 precoder coefficients of layers 0 and 1, respectively.

In an exemplary embodiment, the number of precoder coefficients per layer is dependent on a maximum value of the number of precoder coefficients selected across all layers i.e., $$P_m = \max(P'_l), \forall l,$$

wherein $$P'_l$$

denotes the number of selected precoder coefficients per polarization of the antenna ports. In some examples, the maximum number of precoder coefficients per layer per coefficient subset is $$\left\lceil \frac{P_m}{N} \right\rceil,$$

wherein N is the number of coefficient subsets.

In some examples, the number of coefficient subsets N is equal to 2 and the first coefficient subset comprises $\lceil P_m/2 \rceil$ precoder coefficients per layer and the second coefficient subset comprises the remaining $\lfloor P_m/2 \rfloor$ precoder coefficients per layer.

In some examples, N=2, RI=2 and the number of precoder coefficients of layer 0 and layer 1 are 12 and 8, respectively, and $P_m$=12. Each coefficient subset comprises 6 precoder coefficients of layer 0 and layer 1. As layer 1 is associated with 8 precoder coefficients, the coefficient subset $A_0$ comprises the first 6 precoder coefficients and the coefficient subset $A_1$ comprises the remaining 2 precoder coefficients. The precoder coefficients are ordered with respect to an increasing port index.

In some examples, RI=2 and the number of precoder coefficients for layer 0 and layer 1 are $$P'_0 = 13 \text{ and } P'_1 = 9,$$

respectively. Here $P_m$=13. For N=2, the first coefficient subset $A_0$ comprises the first 7 precoder coefficients of layer 0 and 1, and the second coefficient subset $A_1$ comprises the remaining 6 precoder coefficients and 2 precoder coefficients of layer 0 and layer 1, respectively.

In some examples, RI=2 and the number of port indices per layer 0 and layer 1 are $$P'_0 = 13 \text{ and } P'_1 = 4,$$

respectively. Here $P_m$=13. For N=2, the first coefficient subset $A_0$ comprises the first 7 precoder coefficients of layer 0 and the first 4 precoder coefficients of layer 1, and the second coefficient subset $A_1$ comprises the remaining 6 precoder coefficients of layer 0.

Further Grouping and Ordering of Coefficient Subsets

In accordance with sub-embodiment, denoted, S1-1, the precoder coefficients of each coefficient subset $A_i$ may be further grouped in the CSI report into a number of coefficient subsets $A_i=\{A_{i,1}, \ldots, A_{i,T}\}$, wherein each coefficient subset $A_{i,j}$ comprises the precoder coefficients associated with one subset or two subsets of continuous port indices from U or U' associated with the first and second polarizations of the antenna ports, and a single layer index. The coefficient subsets $A_{i,j}$ are ordered with respect to an increasing layer index.

In accordance with sub-embodiment, denoted S1-2, the precoder coefficients of each coefficient subset $A_i$ may be further grouped in the CSI report into a number of coefficient subsets $A_i=\{A_{i,1}, \ldots, A_{i,T}\}$, wherein each coefficient subset $A_{i,j}$ comprises the precoder coefficients associated with all layer indices associated with the coefficient subset $A_i$, of a single port index and a single polarization. The coefficient subsets $A_{i,j}$ are ordered with respect to an increasing port index.

In accordance with sub-embodiment, denoted S1-3, the precoder coefficients of each coefficient subset $A_i$ may be further grouped in the CSI report into a number of coefficient subsets $A_i=\{A_{i,1}, \ldots, A_{i,T}\}$, wherein each coefficient subset $A_{i,j}$ comprises the precoder coefficients associated with all layer indices associated with the coefficient subset $A_i$, of a single port index and a single polarization. The coefficient subsets $A_{i,j}$ are ordered with respect to an increasing polarization or polarization index.

Ordering of Precoder Coefficients in a Coefficient Subset

The following exemplary embodiments propose ordering schemes of the precoder coefficients in the coefficient subsets $A_{i,j}$ according to sub-embodiment S1-1.

In accordance with embodiments, the precoder coefficients of each coefficient subset $A_{i,j}$ are ordered with respect to an increasing port index.

In accordance with embodiments, the precoder coefficients of each coefficient subset $A_{i,j}$ are ordered with respect to an increasing port index, wherein the precoder coefficients associated with the same port index are ordered with respect to an increasing polarization or polarization index.

In some examples, the number of coefficient subsets is two and for the two coefficient subsets $A_0$ and $A_1$, each subset is associated with P'/2 port indices of the first and second polarizations of the antenna ports. The ordering of the precoder coefficients of coefficient subset $A_0$ for RI=2 is given as:

$$c_{0,0}, c_{0,P'+0}, \ldots, c_{0,\frac{P'}{2}-1}, c_{0,P'+\left(\frac{P'}{2}-1\right)},$$

$$c_{1,0}, c_{1,P'+0}, \ldots, c_{1,\frac{P'}{2}-1}, c_{1,P'+\left(\frac{P'}{2}-1\right)}$$

In accordance with embodiments, the precoder coefficients of each coefficient subset $A_{i,j}$ are ordered with respect to an increasing polarization or polarization index, wherein the precoder coefficients associated with the same polarization or polarization index are ordered with respect to an increasing port index.

In some examples, the number of coefficient subsets is two and for the two coefficient subsets $A_0$ and $A_1$, each subset is associated with P'/2 port indices of the first and second polarizations of the antenna port. The ordering of the precoder coefficients of coefficient subset $A_0$ for RI=2 is given as:

$$c_{0,0}, \ldots, c_{0,\frac{P'}{2}-1}, c_{0,P'+0}, \ldots, c_{0,P'+\left(\frac{P'}{2}-1\right)},$$

$$c_{1,0}, \ldots, c_{1,\frac{P'}{2}-1}, c_{1,P'+0}, \ldots, c_{1,P'+\left(\frac{P'}{2}-1\right)}.$$

The following embodiments propose ordering schemes of the precoder coefficients in the coefficient subsets $A_{i,j}$ according to sub-embodiment S1-2.

In accordance with embodiments, the precoder coefficients of each coefficient subset $A_{i,j}$ are ordered with respect to an increasing layer index, wherein the precoder coefficients associated with the same layer index are ordered with respect to an increasing polarization or polarization index. In some examples, the number of coefficient subsets is two and for the two coefficient subsets $A_0$ and $A_1$, each subset is associated with P'/2 port indices of the first and second polarizations of the antenna ports. The ordering of the precoder coefficients of coefficient subset $A_0$ for RI=2 is given as:

$$c_{0,0}, c_{0,P'+0}, c_{1,0}, c_{1,P'+0}, \ldots, c_{0,\frac{P'}{2}-1}, c_{0,P'+\left(\frac{P'}{2}-1\right)}, c_{1,\frac{P'}{2}-1}, c_{3,P'+\left(\frac{P'}{2}-1\right)}.$$

In accordance with embodiments, the precoder coefficients of each coefficient subset $A_{i,j}$ are ordered with respect to an increasing polarization or polarization index, wherein the precoder coefficients associated with the same polarization or polarization index are ordered with respect to an increasing layer index.

In some examples, the number of coefficient subsets is two and for the two coefficient subsets $A_0$ and $A_1$, each subset is associated with P'/2 port indices of the first and second polarizations of the antenna ports. The ordering of the precoder coefficients of coefficient subset $A_1$ for RI=2 is given as:

$$c_{0,0}, c_{1,0}, c_{1,P'+0}, c_{1,P'+0}, \ldots, c_{0,\frac{P'}{2}-1}, c_{1,\frac{P'}{2}-1}, c_{0,P'+\left(\frac{P'}{2}-1\right)}, c_{1,P'+\left(\frac{P'}{2}-1\right)}.$$

The following embodiments propose ordering schemes of the precoder coefficients in the coefficient subsets $A_{i,j}$ according to sub-embodiment S1-3.

In accordance with embodiments, the precoder coefficients of each coefficient subset $A_{i,j}$ are ordered with respect to an increasing layer index, wherein the precoder coefficients associated with the same layer index are ordered with respect to an increasing port index.

In some examples, the number of coefficient subsets is two and for the two coefficient subsets $A_0$ and $A_1$, each subset is associated with P'/2 port indices of the first and second polarizations of the antenna ports. The ordering of the precoder coefficients of coefficient subset $A_0$ for RI=2 is given as:

$$c_{0,0}, \ldots, c_{0,\frac{P'}{2}-1}, c_{1,0}, \ldots, c_{1,\frac{P'}{2}-1}, c_{0,P'+0},$$

$$\ldots, c_{0,P'+\left(\frac{P'}{2}-1\right)}, c_{1,P'+0}, \ldots, c_{1,P'+\left(\frac{P'}{2}-1\right)}$$

In accordance with embodiments, the precoder coefficients of each coefficient subset $A_{i,j}$ are ordered with respect to an increasing port index, wherein the precoder coefficients associated with the same port index are ordered with respect to an increasing layer index. In some examples, the number of coefficient subsets is two and for the two coefficient subsets $A_0$ and $A_1$, each subset is associated with P'/2 port indices of the first and second polarization of the antenna ports. The ordering of the precoder coefficients of coefficient subset $A_0$ for RI=2 is given as:

$$c_{0,0}, c_{1,0}, \ldots, c_{0,\frac{P'}{2}-1}, c_{1,\frac{P'}{2}-1}, c_{0,P'+0},$$

$$c_{1,P'+0}, \ldots, c_{0,P'+\left(\frac{P'}{2}-1\right)}, c_{1,P'+\left(\frac{P'}{2}-1\right)}$$

In accordance with an embodiment, the bits in the bitmap in the CSI report used to indicate the location of the non-zero precoding coefficients may be ordered in the same way as any one of the afore-described precoder coefficient ordering schemes.

Grouping Schemes of Precoder Coefficients in the CSI Report for Option 2 and Option 3 of the Precoder Formulation Hereafter, the term delay and Doppler pair indices and delay and Doppler index pairs are used interchangeably.

Grouping with Respect to Port Indices

In accordance with an embodiment, each precoder coefficient in a coefficient subset is associated with three indices (l, p, d), wherein a first index, l=0, . . . , RI−1, is a layer index and a second index, p∈U, is a port index, wherein U= {0, . . . , P'−1} or U={0, . . . , 2P'−1} is the set of port indices, and the third index, d=0, . . . , D'−1 is a delay and/or Doppler index or delay and Doppler pair index. When the selection of the precoding coefficients is polarization-independent, the set U comprises P' port indices and is defined by U= {0, . . . , P'−1}. Here, a precoder coefficient associated with port index p∈U is either associated with a first or second polarization of an antenna port. When the selection of the precoding coefficients is polarization-common, the set U comprises 2P' port indices and is defined by U={0, . . . , 2P'−1}. Here, a precoder coefficient associated with port index p∈ {0, . . . , P'−1} is associated with a first polarization of an antenna port, and a precoder coefficient associated with port index p+P' is associated with a second polarization of the same antenna port. Hence, the precoder coefficients associated with port indices {0, . . . , P'−1} are associated with a first polarization of the antenna ports and precoder coefficients associated with port indices {P', . . . , 2P'−1} are associated with a second polarization of the antenna ports.

In accordance with an embodiment S2, the precoder coefficients for the RI layers of the precoding vector or matrix are grouped in the CSI report into a number of non-overlapping coefficient subsets, $A=\{A_0, A_1, \ldots, A_{N-1}\}$, wherein each coefficient subset $A_i$ comprises precoder coefficients of D' delay and/or Doppler indices or D' delay and Doppler index pairs (D'≤D) and RI layers associated with a number of port indices. The precoder coefficients of the l-th layer of a coefficient subset are associated with one subset of continuous port indices from U or two subsets of continuous port indices from U.

In accordance with embodiment, the first coefficient subset may comprise precoder coefficients associated with two polarizations of the antenna ports.

In accordance with an embodiment, each coefficient subset may comprise precoder coefficients associated with two polarizations of the antenna ports.

In accordance with an embodiment, the i-th coefficient subset comprises a subset of the precoder coefficients of the RI layers and D' delay and/or Doppler indices or D' delay and Doppler index pairs, wherein the precoder coefficients of the l-th layer are associated with $B_{i,l}$ port indices (or less than $B_{i,l}$ port indices), wherein the $B_{i,l}$ port indices are defined by a subset of continuous port indices from U or the $B_{i,l}$ port indices are defined by two subsets of continuous port indices from U.

In some examples, the number of port indices $B_{i,l}$ per coefficient subset may be identical for the RI layers.

In some examples, the number of port indices $B_{i,l}$ is identical for all coefficient subsets $A_i$. In some examples, the number of port indices $B_{i,l}$ is non-identical over the coefficient subsets $A_i$.

In some examples, the coefficient subsets $\{A_0, A_1, \ldots, A_{N-1}\}$ are ordered in the CSI report with respect to an increasing subset index.

In an exemplary embodiment, there are 2P' precoder coefficients, wherein P' precoder coefficients are associated with a first polarization of the antenna ports, and P' precoder coefficients are associated with a second polarization of the antenna ports. The precoder coefficients of the RI layers are grouped into two non-overlapping coefficient subsets (N=2) in the CSI report. The first coefficient subset $A_0$ comprises the precoder coefficients of all RI layer indices and all delay and/or Doppler indices associated with the first $$\frac{P'}{2}$$

port indices of a first polarization (p=0 . . . P'/2−1) of the antenna ports, and the precoder coefficients of all RI layer indices and all delay and/or Doppler indices associated with the first P'/2 port indices of a second polarization $$\left(p = P' + 0, \ldots, P' + \frac{P'}{2} - 1\right)$$

of the antenna ports. The second coefficient subset $A_1$ comprises the precoder coefficients of all RI layer indices and all delay and/or Doppler indices associated with the remaining $$\frac{P'}{2}$$

port indices or the first polarization (p=P'/2 . . . , P'−1) of the antenna ports, and the precoder coefficients of all RI layer indices and all delay and/or Doppler indices associated with the remaining P'/2 port indices of the second polarization (p=P'+P'/2, . . . , 2P'−1) of the antenna ports. Note that, in some examples, P'=P.

In some examples, the precoder selection is polarization common and RI=2, P'=8 and D'=2. The set U of port indices is defined by U={0, . . . , 15}. The selected port indices for layer 0 and layer 1 are {0,1,2,3,4,5,9,10,11,13,14,15} and {0,4,5,8,9,11,13,15}, respectively. Each coefficient subset comprises precoder coefficients associated with 4 port indices and all delay and/or Doppler indices of each polarization of both layers. The first coefficient subset $A_0$ comprises precoder coefficients associated with the port indices {0,1, 2,3,9,10,11} and {0,8,9,11} of layer 0 and layer 1, respectively. The second coefficient subset $A_1$ comprises precoder coefficients associated with the port indices {4,5,13,14,15} and {4,5,13,15} of layer 0 and layer 1, respectively.

Grouping Based on Global Port Indices

In accordance with an embodiment, each precoder coefficient in a coefficient subset is associated with two indices (l, p, d), wherein a first index, l=0, . . . , RI−1, is a layer index and a second index, p∈U', is a global port index, wherein U'={0, . . . , P−1} or U'={0, . . . , 2P−1} is the set of global port indices, and d=0, . . . , D'−1 is a delay and/or Doppler index or delay and Doppler pair index. Here, P represents the number of vectors in the first basis set. It is assumed that a mapping between a global port index p∈U' and a local port index p∈U exists. When the selection of the precoding coefficients is polarization-independent, the set U' comprises P port indices and is defined by U'={0, . . . , P−1}. Here, a precoder coefficient associated with port index p∈U' is either associated with a first or second polarization of an antenna port. When the selection of the precoding coefficients is polarization-common, the set U' comprises 2P global port indices and is defined by U'={0, . . . , 2P−1}. Here, a precoder coefficient associated with global port index p∈ {0, . . . , P−1} is associated with a first polarization of an antenna port, and a precoder coefficient associated with global port index p+P is associated with a second polarization of the same antenna port (See FIG. 8).

In an exemplary embodiment, there are 2P' precoder coefficients, wherein P' precoder coefficients are associated with a first polarization of the antenna ports, and P' precoder coefficients are associated with a second polarization of the antenna ports. The precoder coefficients of the RI layers are grouped into two non-overlapping coefficient subsets (N=2) in the CSI report. The first coefficient subset $A_1$ comprises the precoder coefficients of all RI layer indices associated with the first $$\frac{P'}{2}$$

port indices of a first polarization (p=0 . . . P'/2−1) of the antenna ports and all delay and/or Doppler indices or all delay and Doppler pair indices, and the precoder coefficients of all RI layer indices associated with the first P'/2 port indices of a second polarization $$\left(p = P' + 0, \ldots, P' + \frac{P'}{2} - 1\right)$$

of the antenna ports and all delay and/or Doppler indices or all delay and Doppler pair indices. The second coefficient subset $A_2$ comprises the precoder coefficients of all RI layer indices associated with the remaining $$\frac{P'}{2}$$

port indices of a first polarization $$\left(p = \frac{P'}{2}, \dots, P' - 1\right)$$

of the antenna ports and all delay and/or Doppler indices or all delay and Doppler index pairs, and the precoder coefficients of all RI layer indices associated with the remaining $P'/2$ port indices of a second polarization (p=P'+P'/2, ..., 2P'−1) of the antenna ports and all delay and/or Doppler indices. Note that in some examples, P'=P.

In one exemplary embodiment, there are 2P' or P' precoder coefficients, wherein P' precoder coefficients are associated with a first polarization of the antenna ports, and P' precoder coefficients are associated with a second polarization of the antenna ports or P' precoder coefficients are associated with a first and a second polarization of the antenna ports. The precoder coefficients of the RI layers are grouped into two non-overlapping coefficient subsets (N=2) in the CSI report. The first coefficient subset $A_1$ comprises the precoder coefficients of all RI layer indices associated with the first $$\frac{P}{2}$$

port indices of a first polarization (0, ..., P/2−1) of the antenna ports and all delay and/or Doppler indices or all delay and Doppler pair indices, and the precoder coefficients of all RI layer indices associated with the first P/2 port indices of a second polarization $$\left(P + 0, \dots, P + \frac{P}{2} - 1\right)$$

of the antenna ports and all delay and/or Doppler indices or all delay and Doppler pair indices. The second coefficient subset $A_2$ comprises the precoder coefficients of all RI layer indices associated with the remaining $$\frac{P}{2}$$

port indices of a first polarization (P/2, ..., P−1) of the antenna ports and all delay and/or Doppler indices or all delay-Doppler pair indices, and the precoder coefficients of all RI layer indices associated with the remaining P/2 port indices of a second polarization (P+P/2, ..., 2P−1) of the antenna ports and all delay and/or Doppler indices or all delay and Doppler index pairs. Here, P denotes the total number of basis indices of the basis vectors of the first basis set.

Grouping of Coefficient Subsets

In accordance with sub-embodiment S2-1, the precoder coefficients of each coefficient subset $A_i$ may be further grouped in the CSI report into a number of coefficient subsets $A_i=\{_{i,1}, \dots, A_{i,T}\}$, wherein each coefficient subset $A_{i,j}$ comprises the precoder coefficients associated with one subset or two subsets of continuous port indices from U' or U' associated with the first and second polarizations of the antenna ports, RI layers and a single delay and/or Doppler index or delay and Doppler pair index. The coefficient subsets $A_{i,j}$ are ordered with respect to an increasing delay and/or Doppler index or delay and Doppler pair index.

In accordance with sub-embodiment S2-2, the precoder coefficients of each coefficient subset $A_i$ may be further grouped in the CSI report into a number of coefficient subsets $A_i=\{A_{i,1}, \dots, A_{i,T}\}$, wherein each coefficient subset $A_{i,j}$ comprises the precoder coefficients associated with one subset or two subsets of continuous port indices from U' or U' associated with the first and second polarizations of the antenna ports, all delay and/or Doppler indices or all delay and Doppler pair indices and a single layer index. The coefficient subsets $A_{i,j}$ are ordered with respect to an increasing layer index.

In accordance with sub-embodiment S2-3, the precoder coefficients of each coefficient subset $A_i$ may be further grouped in the CSI report into a number of coefficient subsets $A_i=\{A_{i,1}, \dots, A_{i,T_3}\}$, wherein each coefficient subset $A_{i,j}$ comprises the precoder coefficients associated with all layer indices associated with the coefficient subset $A_i$, all delay and/or Doppler indices or all delay and Doppler pair indices of a single port index of a single polarization. The coefficient subsets $A_{i,j}$ are ordered with respect to an increasing port index, wherein the coefficient subsets associated with the same port index are ordered with respect to an increasing polarization index.

In accordance with sub-embodiment S2-4, the precoder coefficients of each coefficient subset $A_i$ may be further grouped in the CSI report into a number of coefficient subsets $A_i=\{A_{i,1}, \dots, A_{i,T_3}\}$, wherein each coefficient subset $A_{i,j}$ comprises the precoder coefficients associated with all layer indices associated with the coefficient subset $A_i$, all delay and/or Doppler indices or all delay and Doppler pair indices of a single port index of a single polarization. The coefficient subsets $A_{i,j}$ are ordered with respect to an increasing polarization index, wherein the coefficient subsets associated with the same polarization index are ordered with respect to an increasing port index.

Ordering of Precoder Coefficients in Coefficient Subsets

The following exemplary embodiment proposes ordering schemes of the precoder coefficients in the coefficient subsets $A_{i,j}$ according to sub-embodiment S2-1.

In accordance with an embodiment, the precoder coefficients of each coefficient subset $A_{i,j}$ are ordered with respect to an increasing layer index, wherein the precoder coefficients associated with the same layer index are ordered with respect to an increasing port index.

In accordance with an embodiment, the precoder coefficients of each coefficient subset $A_{i,j}$ are ordered with respect to an increasing layer index, wherein the precoder coefficients associated with the same layer index are ordered with respect to an increasing port index, and the coefficients associated with the same port index are ordered with respect to an increasing polarization or polarization index.

In some examples, the number of coefficient subsets is two and for two coefficient subsets $A_0$ and $A_1$, the precoder coefficients of each subset are associated with P'/2 port indices of the first and second polarization. The ordering of the precoder coefficients of coefficient subset $A_1$ for RI=2 and D'=2 is given as:

$$c_{0,0,0}, c_{0,P'+0,0}, \ldots, c_{0,\frac{P'}{2}-1,0}, c_{0,P'+\left(\frac{P'}{2}-1\right),0},$$

$$c_{1,0,0}, c_{1,P'+0,0}, \ldots, c_{1,\frac{P'}{2}-1,0}, c_{1,P'+\left(\frac{P'}{2}-1\right),0},$$

$$c_{0,0,1}, c_{0,P'+0,1}, \ldots, c_{0,\frac{P'}{2}-1,1}, c_{0,P'+\left(\frac{P'}{2}-1\right),1},$$

$$c_{1,0,1}, c_{1,P'+0,1}, \ldots, c_{1,\frac{P'}{2}-1,1}, c_{1,P'+\left(\frac{P'}{2}-1\right),1}.$$

In accordance with embodiments, the precoder coefficients of each coefficient subset $A_{i,j}$ are ordered with respect to an increasing polarization index, wherein the precoder coefficients associated with the same polarization index are ordered with respect to an increasing layer index and the coefficients associated with the same layer index are ordered with respect to an increasing port index.

In some examples, the number of coefficient subsets is two and for the two coefficient subsets $A_0$ and $A_1$, each subset is associated with P'/2 port indices of the first and second polarizations. The ordering of the precoder coefficients of coefficient subset $A_1$ for RI=2 and D'=2 is given as:

$$c_{0,0,0}, \ldots, c_{0,\frac{P'}{2}-1,0}, c_{1,0,0}, \ldots, c_{1,\frac{P'}{2}-1,0}, c_{0,P'+0,0}, \ldots,$$

$$c_{0,P'+\left(\frac{P'}{2}-1\right),0}, c_{1,P'+0,0}, \ldots, c_{1,P'+\left(\frac{P'}{2}-1\right),0},$$

$$c_{0,0,1}, \ldots, c_{0,\frac{P'}{2}-1,1}, c_{1,0,1}, \ldots, c_{1,\frac{P'}{2}-1,1}, c_{0,P'+0,1}, \ldots,$$

$$c_{0,P'+\left(\frac{P'}{2}-1\right),1}, c_{1,P'+0,1}, \ldots, c_{1,P'+\left(\frac{P'}{2}-1\right),1}.$$

In accordance with an embodiment, the precoder coefficients of each coefficient subset $A_{i,j}$ are ordered with respect to an increasing port index, wherein the precoder coefficients associated with the same port index are ordered with respect to an increasing layer index.

In accordance with an embodiment, the precoder coefficients of each coefficient subset $A_{i,j}$ are ordered with respect to an increasing port index, wherein the precoder coefficients associated with the same port index are ordered with respect to an increasing polarization index and the coefficients associated with the same polarization index are ordered with respect to an increasing layer index.

In some examples, the number of coefficient subsets is two and for the two coefficient subsets $A_0$ and $A_1$, each subset is associated with P'/2 port indices of the first and second polarizations. The ordering of the precoder coefficients of coefficient subset $A_1$ for RI=2 and D'=2 is given as:

$$c_{0,0,0}, c_{1,0,0}, c_{0,P'+0,0}, c_{1,P'+0,0}, \ldots, c_{0,\frac{P'}{2}-1,0},$$

$$c_{1,\frac{P'}{2}-1,0}, c_{0,P'+\left(\frac{P'}{2}-1\right),0}, c_{1,P'+\left(\frac{P'}{2}-1\right),0},$$

$$c_{0,0,1}, c_{1,0,1}, c_{0,P'+0,1}, c_{1,P'+0,1}, \ldots, c_{0,\frac{P'}{2}-1,1},$$

$$c_{1,\frac{P'}{2}-1,1}, c_{0,P'+\left(\frac{P'}{2}-1\right),1}, c_{1,P'+\left(\frac{P'}{2}-1\right),1}.$$

In accordance with an embodiment, the precoder coefficients of each coefficient subset $A_{i,j}$ are ordered with respect to an increasing polarization index, wherein the precoder coefficients associated with the same polarization index are ordered with respect to an increasing port index and the coefficients associated with the same port index are ordered with respect to an increasing layer index.

In some examples, the number of coefficient subsets is two and for the two coefficient subsets $A_0$ and $A_1$, each subset is associated with P'/2 port indices of the first and second polarizations. The ordering of the precoder coefficients of coefficient subset $A_1$ for RI=2 and D'=2 is given as:

$$c_{0,0,0}, c_{1,0,0}, \ldots, c_{0,\frac{P'}{2}-1,0}, c_{1,\frac{P'}{2}-1,0}, c_{0,P'+0,0},$$

$$c_{1,P'+0,0}, \ldots, c_{0,P'+\left(\frac{P'}{2}-1\right),0}, c_{1,P'+\left(\frac{P'}{2}-1\right),0},$$

$$c_{0,0,1}, c_{1,0,1}, \ldots, c_{1,\frac{P'}{2}-1,1}, c_{1,\frac{P'}{2}-1,1}, c_{0,P'+0,1},$$

$$c_{1,P'+0,1}, \ldots, c_{0,P'+\left(\frac{P'}{2}-1\right),1}, c_{0,P'+\left(\frac{P'}{2}-1\right),1}.$$

The following exemplary embodiment proposes ordering schemes of the precoder coefficients in the coefficient subsets $A_{i,j}$ according to sub-embodiment S2-2.

In accordance with an embodiment, the precoder coefficients of each coefficient subset $A_{i,j}$ are ordered with respect to an increasing port index, wherein the precoder coefficients associated with the same port index are ordered with respect to an increasing delay and/or Doppler index or delay and Doppler pair index.

In accordance with an embodiment, the precoder coefficients of each coefficient subset $A_{i,j}$ are ordered with respect to an increasing port index, wherein the precoder coefficients associated with the same port index are ordered with respect to an increasing polarization index and the precoder coefficients associated with the same polarization index are ordered with respect to an increasing delay and/or Doppler index or delay and Doppler pair index.

In some examples, the number of coefficient subsets is two and for the two coefficient subsets $A_0$ and $A_1$, each subset is associated with P'/2 port indices of the first and second polarizations. The ordering of the precoder coefficients of coefficient subset $A_1$ for RI=2 and D'=2 is given as:

$$c_{0,0,0}, c_{0,0,1}, c_{0,P'+0,0}, c_{0,P'+0,1}, \ldots, c_{0,\frac{P'}{2}-1,0},$$

$$c_{0,\frac{P'}{2}-1,1}, c_{0,P'+\left(\frac{P'}{2}-1\right),0}, c_{0,P'+\left(\frac{P'}{2}-1\right),1},$$

$$c_{1,0,0}, c_{1,0,1}, c_{1,P'+0,0}, c_{1,P'+0,1}, \ldots, c_{1,\frac{P'}{2}-1,0},$$

$$c_{1,\frac{P'}{2}-1,1}, c_{1,P'+\left(\frac{P'}{2}-1\right),0}, c_{1,P'+\left(\frac{P'}{2}-1\right),1}.$$

In accordance with an embodiment, the precoder coefficients of each coefficient subset $A_{i,j}$ are ordered with respect to an increasing polarization index, wherein the precoder coefficients associated with the same polarization index are ordered with respect to an increasing port index and the precoder coefficients associated with the same port index are ordered with respect to an increasing delay and/or Doppler index or delay and Doppler pair index.

In some examples, the number of coefficient subsets is two and for the two coefficient subsets $A_0$ and $A_1$, each subset is associated with P'/2 port indices of the first and second polarization. The ordering of the precoder coefficients of coefficient subset $A_1$ for RI=2 and D'=2 is given as:

$$c_{0,0,0}, c_{0,0,1}, \ldots, c_{0,\frac{P'}{2}-1,0}, c_{0,\frac{P'}{2}-1,1}, c_{0,P'+0,0},$$

$$c_{0,P'+0,1}, \ldots, c_{0,P'+\left(\frac{P'}{2}-1\right),0}, c_{0,P'+\left(\frac{P'}{2}-1\right),1},$$

$$c_{1,0,0}, c_{1,0,1}, \ldots, c_{1,\frac{P'}{2}-1,0}, c_{1,\frac{P'}{2}-1,1}, c_{1,P'+0,0},$$

$$c_{1,P'+0,1}, \ldots, c_{1,P'+\left(\frac{P'}{2}-1\right),0}, c_{1,P'+\left(\frac{P'}{2}-1\right),1}.$$

In accordance with an embodiment, the precoder coefficients of each coefficient subset $A_{i,j}$ are ordered with respect to an increasing delay and/or Doppler index or delay and Doppler pair index, wherein the precoder coefficients associated with the same delay and/or Doppler index or delay and Doppler pair index are ordered with respect to an increasing port index.

In accordance with an embodiment, the precoder coefficients of each coefficient subset $A_{i,j}$ are ordered with respect to an increasing delay and/or Doppler index or delay and Doppler pair index, wherein the precoder coefficients associated with the same delay and/or Doppler index or delay and Doppler pair index are ordered with respect to an increasing polarization index and the precoder coefficients associated with the same polarization index are ordered with respect to an increasing port index.

In some examples, the number of coefficient subsets is two and for the two coefficient subsets $A_0$ and $A_1$, each subset is associated with P'/2 port indices of the first and second polarizations. The ordering of the precoder coefficients of coefficient subset $A_1$ for RI=2 and D'=2 is given as:

$$c_{0,0,0}, \ldots, c_{0,\frac{P'}{2}-1,0}, c_{0,P'+0,0}, \ldots, c_{0,P'+\left(\frac{P'}{2}-1\right),0},$$

$$c_{0,0,1}, \ldots, c_{0,P'-1,1}, c_{0,P'+0,1}, \ldots, c_{0,P'+\left(\frac{P'}{2}-1\right),1},$$

$$c_{1,0,0}, \ldots, c_{1,\frac{P'}{2}-1,0}, c_{1,P'+0,0}, \ldots, c_{1,P'+\left(\frac{P'}{2}-1\right),0},$$

$$c_{1,0,1}, \ldots, c_{1,\frac{P'}{2}-1,1}, c_{1,P'+0,1}, \ldots, c_{1,P'+\left(\frac{P'}{2}-1\right),1}.$$

In accordance with an embodiment, the precoder coefficients of each coefficient subset $A_{i,j}$ are ordered with respect to an increasing delay and/or Doppler index or delay and Doppler pair index, wherein the precoder coefficients associated with the same delay and/or Doppler index or delay and Doppler pair index are ordered with respect to an increasing port index and the precoder coefficients associated with the same port index are ordered with respect to an increasing polarization index.

In some examples, the number of coefficient subsets is two and for the two coefficient subsets $A_0$ and $A_1$, each subset is associated with P'/2 port indices of the first and second polarizations. The ordering of the precoder coefficients of coefficient subset $A_1$ for RI=2 and D'=2 is given as:

$$c_{0,0,0}, c_{0,P'+0,0}, \ldots, c_{0,\frac{P'}{2}-1,0}, c_{0,P'+\left(\frac{P'}{2}-1\right),0},$$

$$c_{0,0,1}, c_{0,P'+0,1}, \ldots, c_{0,\frac{P'}{2}-1,1}, c_{0,P'+\left(\frac{P'}{2}-1\right),1},$$

-continued $$c_{1,0,0}, c_{1,P'+0,0}, \ldots, c_{1,\frac{P'}{2}-1,0}, c_{1,P'+\left(\frac{P'}{2}-1\right),0},$$

$$c_{1,0,1}, c_{1,P'+0,1}, \ldots, c_{1,\frac{P'}{2}-1,1}, c_{1,P'+\left(\frac{P'}{2}-1\right),1}.$$

The following exemplary embodiment proposes ordering schemes of the precoder coefficients in the coefficient subsets $A_{i,j}$ according to sub-embodiment S2-3.

In accordance with an embodiment, the precoder coefficients of each coefficient subset $A_{i,j}$ are ordered with respect to an increasing layer index, wherein the precoder coefficients associated with the same layer index are ordered with respect to an increasing delay and/or Doppler index or delay and Doppler pair index.

In some examples, the number of coefficient subsets is two and for the two coefficient subsets $A_0$ and $A_1$, each subset is associated with P'/2 port indices of the first and second polarizations. The ordering of the precoder coefficients of coefficient subset $A_1$ for RI=2 and D'=2 is given as:

$$c_{0,0,0}, c_{0,0,1}, c_{1,0,0}, c_{1,0,1}, c_{0,P'+0,0}, c_{0,P'+0,1},$$

$$c_{1,P'+0,0}, c_{1,P'+0,1}, \ldots, c_{0,\frac{P'}{2}-1,0}, c_{0,\frac{P'}{2}-1,1},$$

$$, c_{1,\frac{P'}{2}-1,0}, c_{1,\frac{P'}{2}-1,1}, c_{0,P'+\left(\frac{P'}{2}-1\right),0},$$

$$c_{0,P'+\left(\frac{P'}{2}-1\right),1}, c_{1,P'+\left(\frac{P'}{2}-1\right),0}, c_{1,P'+\left(\frac{P'}{2}-1\right),1}.$$

In accordance with an embodiment, the precoder coefficients of each coefficient subset $A_{i,j}$ are ordered with respect to an increasing delay and/or Doppler index or delay and Doppler pair index, wherein the precoder coefficients associated with the same delay and/or Doppler index or delay and Doppler pair index are ordered with respect to an increasing layer index.

In some examples, the number of coefficient subsets is two and for the two coefficient subsets $A_0$ and $A_1$, each subset is associated with P'/2 port indices of the first and second polarizations. The ordering of the precoder coefficients of coefficient subset $A_1$ for RI=2 and D'=2 is given as:

$$c_{0,0,0}, c_{1,0,0}, c_{0,0,1}, c_{1,0,1}, c_{0,P'+0,0}, c_{1,P'+0,0},$$

$$c_{0,P'+0,1}, c_{1,P'+0,1}, \ldots, c_{0,\frac{P'}{2}-1,0}, c_{1,\frac{P'}{2}-1,0},$$

$$c_{0,\frac{P'}{2}-1,1}, c_{1,\frac{P'}{2}-1,1}, c_{0,P'+\left(\frac{P'}{2}-1\right),0}, c_{1,P'+\left(\frac{P'}{2}-1\right),0}, c_{0,P'+\left(\frac{P'}{2}-1\right),1}, c_{1,P'+\left(\frac{P'}{2}-1\right),1}.$$

The following exemplary embodiment proposes ordering schemes of the precoder coefficients in the coefficient subsets $A_{i,j}$ according to sub-embodiment S2-4.

In accordance with an embodiment, the precoder coefficients of each coefficient subset $A_{i,j}$ are ordered with respect to an increasing layer index, wherein the precoder coefficients associated with the same layer index are ordered with respect to an increasing delay and/or Doppler index or delay and Doppler pair index.

In some examples, the number of coefficient subsets is two and for the two coefficient subsets $A_0$ and $A_1$, each subset is associated with P'/2 port indices of the first and second polarizations. The ordering of the precoder coefficients of coefficient subset $A_1$ for RI=2 and D'=2 is given as:

$$c_{0,0,0}, c_{0,0,1}, c_{1,0,0}, c_{1,0,1}, \ldots, c_{0,\frac{P'}{2}-1,0},$$

$$c_{0,\frac{P'}{2}-1,1}, c_{1,\frac{P'}{2}-1,0}, c_{1,\frac{P'}{2}-1,1}, c_{0,P'+0,0}, c_{0,P'+0,1},$$

$$c_{1,P'+0,0}, c_{1,P'+0,1}, \ldots, c_{0,P'+\left(\frac{P'}{2}-1\right),0},$$

$$c_{0,P'+\left(\frac{P'}{2}-1\right),1}, c_{1,P'+\left(\frac{P'}{2}-1\right),0}, c_{1,P'+\left(\frac{P'}{2}-1\right),1}.$$

In accordance with an embodiment, the precoder coefficients of each coefficient subset $A_{i,j}$ are ordered with respect to an increasing delay and/or Doppler index or delay and Doppler pair index, wherein the precoder coefficients associated with the same delay and/or Doppler index or delay and Doppler pair index are ordered with respect to an increasing layer index.

In some examples, the number of coefficient subsets is two and for the two coefficient subsets $A_0$ and $A_1$, each subset is associated with P'/2 port indices of the first and second polarizations. The ordering of the precoder coefficients of coefficient subset $A_1$ for RI=2 and D'=2 is given as:

$$c_{0,0,0}, c_{1,0,0}, c_{0,0,1}, c_{1,0,1}, \ldots, c_{0,\frac{P'}{2}-1,0},$$

$$c_{1,\frac{P'}{2}-1,0}, c_{0,\frac{P'}{2}-1,1}, c_{1,\frac{P'}{2}-1,1}, c_{0,P'+0,0},$$

$$c_{1,P'+0,0}, c_{0,P'+0,1}, c_{1,P'+0,1}, \ldots, c_{0,P'+\left(\frac{P'}{2}-1\right),0},$$

$$c_{1,P'+\left(\frac{P'}{2}-1\right),0}, c_{0,P'+\left(\frac{P'}{2}-1\right),1}, c_{1,P'+\left(\frac{P'}{2}-1\right),1}.$$

In accordance with an embodiment, the bits in the bitmap in the CSI report used to indicate the location of the non-zero precoding coefficients may be ordered in the same way as any one of the afore-described precoder coefficient ordering schemes.

Ordering of FD Indices for Option 2 and Option 3 of the Precoder Formulation

The precoder coefficients associated with the basis vector index (from the second basis set) of the strongest coefficient carries significantly more energy than the remaining precoder coefficients associated with the other basis vector indices. Thus, these precoder coefficients may have a higher priority than the remaining precoder coefficients (that have a lower priority) as they largely influence the performance of the precoder. In order to ensure that the high priority precoder coefficients (the precoder coefficients associated with the basis vector index of the strongest coefficient) are not omitted in the occurrence of a CSI omission, the precoder coefficients with highest priority are placed at the beginning, where the precoder coefficients are grouped or packed in the CSI report. For example, in case of CSI omission the UE may drop the $\lfloor K_{NZ}/2 \rfloor$ precoder coefficients with a lower priority from the CSI report and keep the $$\lceil K_{NZ}/2 \rceil \text{ or } \left( \left\lceil \frac{K_{NZ}}{2} \right\rceil - RI \right)$$

precoder coefficients with a higher priority from the CSI report, wherein $K_{NZ}$ denotes the total number of precoder coefficients or non-zero coefficients.

Thus, it is advantageous to group the precoder coefficients in the CSI report with respect to their new delay index as proposed in the following embodiments.

In accordance with an embodiment, the precoder coefficients associated with the same layer index l (l=0, . . . , RI−1) and the delay and/or Doppler index d (d=0, . . . , D−1 or d=0, . . . , D'−1) are ordered or grouped according to a predefined rule or pattern in the CSI report with respect to a reference delay and/or Doppler index $d_r \in \{0, \ldots, D−1\}$ or $d_r \in \{0, \ldots, D'−1\}$ associated with a layer index l In accordance with an embodiment, the precoder coefficients associated with the layer index, l, and the delay and/or Doppler index, $d_r$, same as the layer index and delay and/or Doppler index of a maximum or strongest coefficient are ordered such that the ordered precoder coefficients are associated with the new delay and/or Doppler index d'=0. In this case, the reference delay and/or Doppler index $d_r$ is defined by the delay and/or Doppler index associated with a maximum or strongest coefficient.

In an exemplary embodiment, the precoder coefficients or the delay and/or Doppler indices are ordered with respect to a modulo operation d'=(d−$d_r$)mod D, wherein d' is the new delay and/or Doppler index (after the modulo operation) and $d_r$ is the reference delay and/or Doppler index associated with the maximum or strongest coefficient. Note that the ordered precoder coefficients associated with the layer index and the delay and/or Doppler index same as the maximum or strongest coefficient are associated with the new delay and/or Doppler index d'=0.

In some examples, for D=4, d=0, 1, 2, 3, and for layer l, the delay and/or Doppler index of the maximum or strongest coefficient is $d_r$=1. According to the above ordering, the precoder coefficients associated with delay and/or Doppler index $d_r$=1 are associated with the new delay and/or Doppler index d'=0, the precoder coefficients associated with delay and/or Doppler index d=0 are associated with the new delay and/or Doppler index d'=3, the precoder coefficients associated with delay and/or Doppler index d=2 are associated with the new delay and/or Doppler index d'=1, and the precoder coefficients associated with delay and/or Doppler index d=3 are associated with the new delay and/or Doppler index d'=2.

In an exemplary embodiment, the precoder coefficients or the delay and/or Doppler indices are ordered such that the precoder coefficients associated with the same layer index and the same delay and/or Doppler index same as the maximum or strongest coefficient are associated with the new delay and/or Doppler index d'=0 and the remaining precoder coefficients associated with the same layer index and the remaining delay and/or Doppler indices are ordered with respect to an increasing delay and/or Doppler index or decreasing delay and/or Doppler index.

In some examples, for D=4, d=0, 1, 2, 3, and for layer l, the delay and/or Doppler index of the maximum or strongest coefficient is $d_r$=1. According to the ordering above, the precoder coefficients associated with delay and/or Doppler index $d_r$=1 are associated with the new delay and/or Doppler index d'=0, the precoder coefficients associated with delay and/or Doppler index d=0 are associated with the new delay and/or Doppler index d'=1, the precoder coefficients associated with delay and/or Doppler index d=2 are associated with the new delay and/or Doppler index d'=2, and the precoder coefficients associated with delay and/or Doppler index d=3 are associated with the new delay and/or Doppler index d'=3.

In some examples, for D=4, d=0, 1, 2, 3, and for layer l, the delay and/or Doppler index of the maximum or strongest coefficient is $d_r$=1. According to the ordering above, the precoder coefficients associated with delay and/or Doppler index $d_r$=1 are associated with the new delay and/or Doppler index d'=0, the precoder coefficients associated with delay and/or Doppler index d=3 are associated with the new delay and/or Doppler index d'=2, the precoder coefficients associated with delay and/or Doppler index d=2 are associated with the new delay and/or Doppler index d'=3, and the precoder coefficients associated with delay and/or Doppler index d=0 are associated with the new delay and/or Doppler index d'=4.

In accordance with an embodiment, the precoder coefficients per layer associated with a set of basis vectors of the second basis set are ordered with respect to the basis indices f of the basis vectors. In some examples, the precoder coefficients associated with a basis index f are ordered with respect to a modulo operation $f_r=(f-f_r) \bmod N_3$, wherein $f_r \in \{0, \ldots, N_3-1\}$ is the new basis index (after the modulo operation) and $f_r$ is a reference basis index associated with a maximum or strongest coefficient. Note that the ordered precoder coefficients associated with the layer and the delay same as the maximum or strongest coefficient are associated with the new basis index $f_r=0$.

In some examples, for D=4, f=0, 1, 11, 12, and $N_3=13$ and for layer l, the basis index of the maximum or strongest coefficient is $f_r=1$. According to the ordering above, the precoder coefficients associated with the basis indices f={0, 1,11,12} are now mapped to the new basis indices $f_r=$\{1,0, 10,11\}.

In accordance with an embodiment, the precoder coefficients associated with the new basis index $f_r=0$ is mapped to the new delay and/or Doppler index d'=0.

In accordance with an embodiment, the precoder coefficients of the new basis indices $f_r$ other than $f_r=0$ are mapped to the new delay and/or Doppler indices d' according to a specific ordering of the $N_3$ delays as:

$$N_3 - 1, 1, N_3 - 2, 2, \ldots, N_3 - \left\lceil \frac{N_3}{2} \right\rceil + 1, \left\lfloor \frac{N_3}{2} \right\rfloor, \text{ for odd } N_3$$

$$N_3 - 1, 1, N_3 - 2, 2, \ldots, N_3 - \left\lceil \frac{N_3}{2} \right\rceil + 1, \left\lfloor \frac{N_3}{2} \right\rfloor - 1, \left\lfloor \frac{N_3}{2} \right\rfloor, \text{ for even } N_3$$

In some examples, for D=4, $f_r=$\{1,0,11,12\}, and for layer l, the basis index of the maximum or strongest coefficient is $f_r=1$. According to the ordering above, the precoder coefficients associated with the new basis indices $f_r=$\{1,0,11,12\} are now mapped to the new delay and/or Doppler indices d'=\{0,1,2,3\} as follows.

The precoder coefficients associated with the delay $f_r=0$ are associated with the new delay and/or Doppler index d'=0, the precoder coefficients associated with the delay $f_r=12$ are associated with the new delay and/or Doppler index d'=1, the precoder coefficients associated with the delay $f_r=1$ are associated with the new delay and/or Doppler index d'=2, and the precoder coefficients associated with the delay $f_r=11$ are associated with the new delay and/or Doppler index d'=3.

In accordance with an embodiment, the CSI report comprises an indication indicating the reference delay and/or Doppler index. In some examples, the indicator indicating the reference delay and/or Doppler index is given by a $\lceil \log_2(D') \rceil$-bit indicator or a $\lceil \log_2(D) \rceil$-bit indicator, wherein D'≤D.

In accordance with embodiments, the grouping of the precoder coefficients into at least two coefficient subsets and the ordering of the coefficient subsets and the precoder coefficients within each coefficient subset is based on the new delay and/or Doppler index d' instead of delay and/or Doppler index d.

Figure 9:
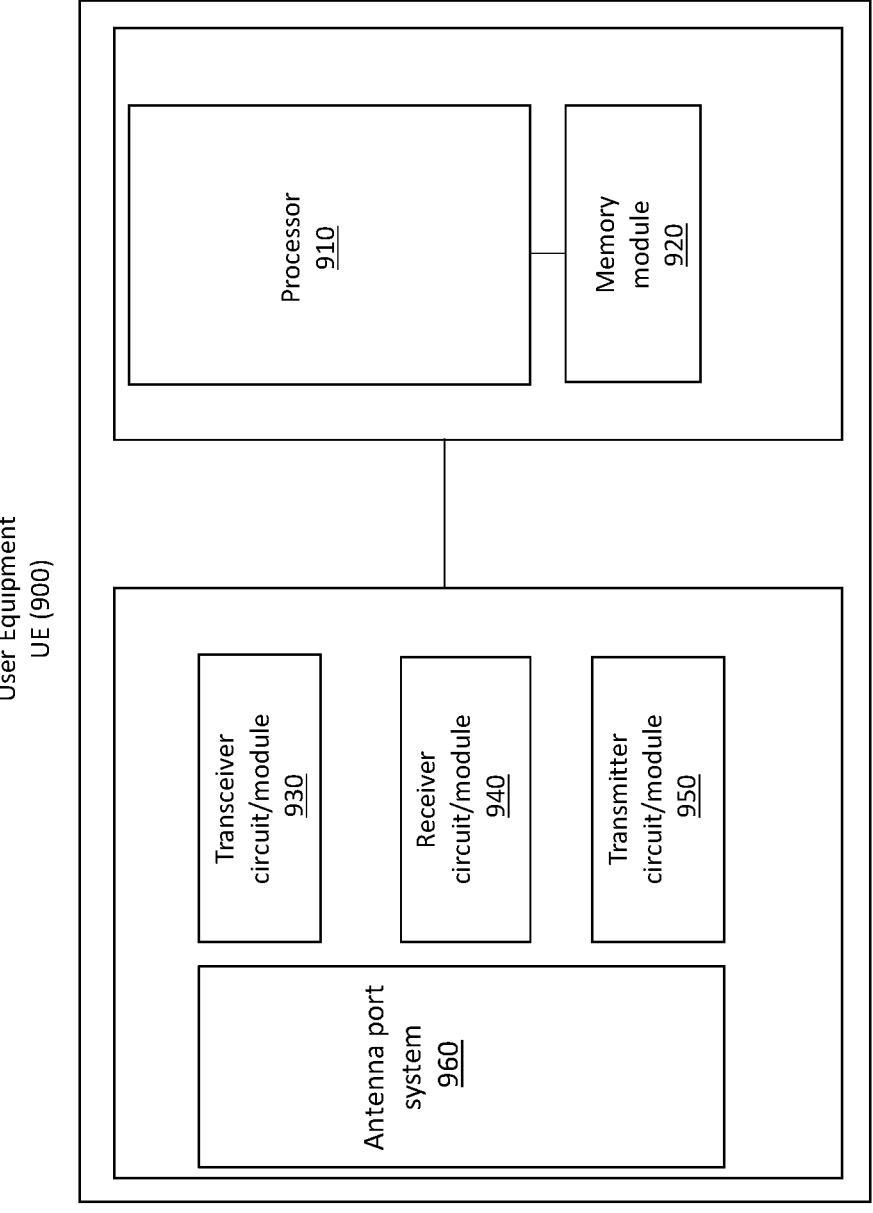
FIG. 9 is a simplified block diagram depicting a user equipment according to some embodiments herein.

In order to perform the previously described process or method steps performed by the UE there is also provided a UE. FIG. 9 illustrates a block diagram depicting a UE 900. The UE 900 comprises a processor 910 or processing circuit or a processing module or a processor or means 910; a receiver circuit or receiver module 940; a transmitter circuit or transmitter module 950; a memory module 920, a transceiver circuit or transceiver module 930 which may include the transmitter circuit 950 and the receiver circuit 940. The UE 900 further comprises an antenna port system 960 which includes antenna circuitry for transmitting and receiving signals to/from at least the network node. The antenna port system 960 employs beamforming as previously described.

As previously described, the UE 900 is configured to: receive from a network node a CSI report configuration; determine based on the received CSI report configuration, a number of precoder coefficients for Rank Index, RI, transmission layers of a precoder vector or matrix; group the precoder coefficients of the RI transmission layers into at least two coefficient subsets, each coefficient subset comprising a plurality of precoder coefficients; assign an ordering to said at least two coefficient subsets and an ordering to the precoder coefficients within each coefficient subset; dividing said at least two coefficient subsets into two or more CSI groups having associated priority levels; generate a CSI report comprising a CSI part 1 and a CSI part 2, wherein the CSI part 1 has a fixed payload size and comprises information indicating the size of the payload of the CSI part 2, wherein the CSI part 2 includes the precoder coefficients of at least one of the two CSI groups; and transmit or report an uplink control information (UCI) including the CSI report over an uplink, UL, channel to the network node.

Additional actions performed by the UE 900 have already been described and need not be repeated again.

The UE 900 may belong to any radio access technology including 4G or LTE, LTE-A, 5G, advanced 5G or a combination thereof that support beamforming technology. The UE comprising the processor and the memory contains instructions executable by the processor, whereby the UE 900 is operative or is configured to perform any one of the embodiments related to the UE previously described.

The processing module/circuit 910 includes a processor, microprocessor, an application specific integrated circuit (ASIC), field programmable gate array (FPGA), or the like, and may be referred to as the "processor." The processor 910 controls the operation of the network node and its components. Memory (circuit or module) 920 includes a random-access memory (RAM), a read only memory (ROM), and/or another type of memory to store data and instructions that may be used by processor 910. In general, it will be understood that the network node in one or more embodiments includes fixed or programmed circuitry that is configured to carry out the operations in any of the embodiments disclosed herein.

In at least one such example, the processor 910 includes a microprocessor, microcontroller, DSP, ASIC, FPGA, or other processing circuitry that is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed in this disclosure relating to the UE. Further, it will be appreciated that the UE 900 may comprise additional components.

Figure 10:
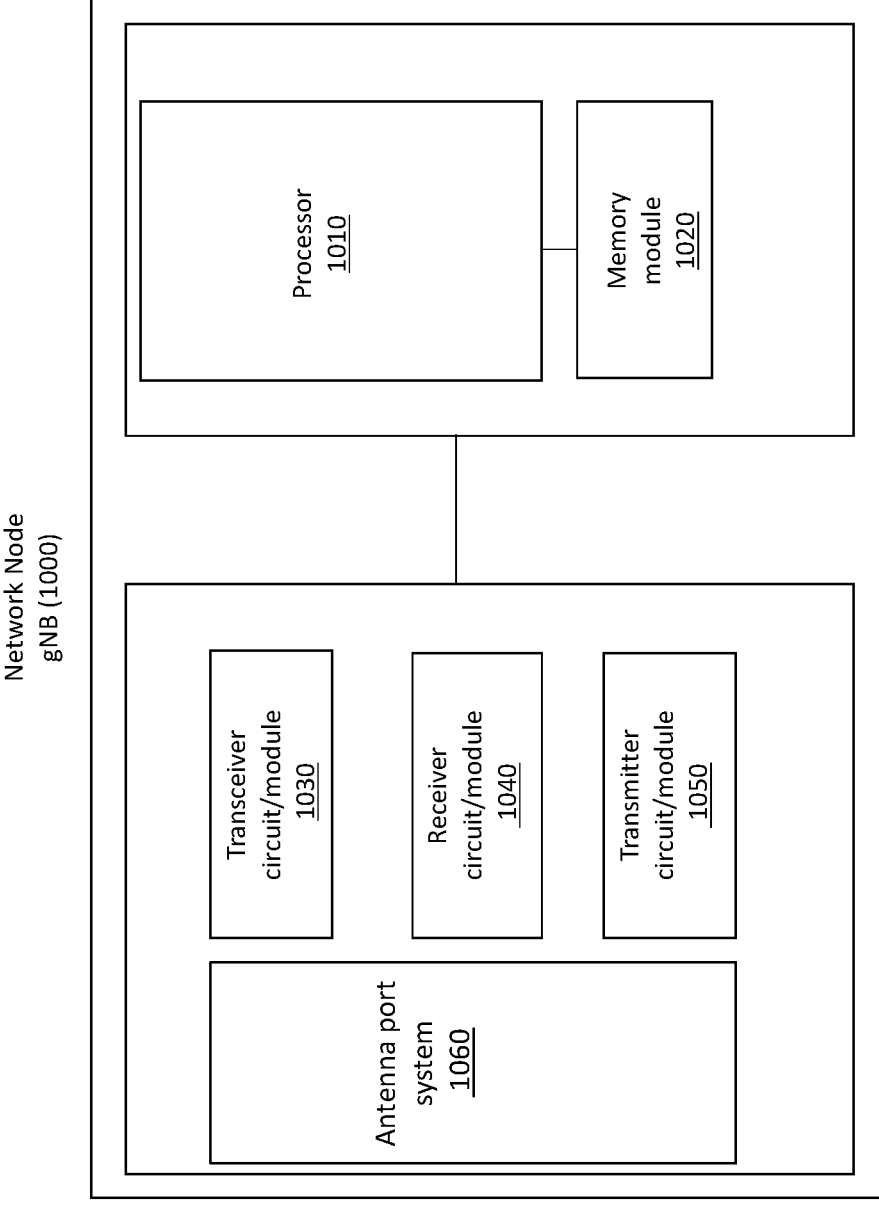
FIG. 10 is a simplified block diagram depicting a network node according to some embodiments herein.

In order to perform the previously described process or method steps performed by the network node, there is also provided a network node (or gNB). FIG. 10 illustrates an exemplary block diagram of a network node 1000. The network node 1000 comprises a processor 1010 or processing circuit or a processing module or a processor or means 1010; a receiver circuit or receiver module 1040; a transmitter circuit or transmitter module 1050; a memory module 1020, a transceiver circuit or transceiver module 1030 which may include the transmitter circuit 1050 and the receiver circuit 1040. The network node 1000 further comprises an antenna system 1060 which includes antenna circuitry for transmitting and receiving signals to/from at least the UE. The antenna port system 1060 employs beamforming as previously described. The actions performed by the network node 1000 have already been described. The network node 1000 may also be viewed as a Transmitter and Receiver Point (TRP).

The processing module/circuit 1010 includes a processor, microprocessor, an application specific integrated circuit (ASIC), field programmable gate array (FPGA), or the like, and may be referred to as the "processor." The processor 1010 controls the operation of the network node and its components. Memory (circuit or module) 1020 includes a random-access memory (RAM), a read only memory (ROM), and/or another type of memory to store data and instructions that may be used by processor 1010. In general, it will be understood that the network node in one or more embodiments includes fixed or programmed circuitry that is configured to carry out the operations in any of the embodiments disclosed herein.

In at least one such example, the processor 1010 includes a microprocessor, microcontroller, DSP, ASIC, FPGA, or other processing circuitry that is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed in this disclosure. Further, it will be appreciated that the network node 1000 may comprise additional components.

The network node 1000 may belong to any radio access technology including 4G or LTE, LTE-A, 5G, advanced 5G or a combination thereof that support beamforming technology. The network node 1000 comprising the processor and the memory contains instructions executable by the processor, whereby the network node 1000 is operative or is configured to perform any one of the subject-matter presented in this disclosure related to the network node (or gNB).

As previously described, the network node 1000 is configured to: transmit to the UE, a CSI report configuration for enabling the UE to determine based on the transmitted CSI report configuration a number of precoder coefficients for RI transmission layers of a precoder vector or matrix; receive from the UE, over an uplink channel, an UCI including the CSI report generated by the UE, the CSI report comprising a CSI part 1 and a CSI part 2, wherein CSI part 1 has a fixed payload size and comprises information indicating the size of the payload of CSI part 2, wherein CSI part 2 includes the precoder coefficients of the at least one of the two or more CSI groups, and wherein the precoder coefficients are ordered in at least two ordered coefficient subsets.

Additional details on the functions and operations performed by the network node have already been described and need not be repeated again.

Several advantages of the described embodiments in this disclosure are achieved as previously described and which include significantly reducing the feedback overhead and the computational complexity at the UE for codebook-based CSI reporting, assuming information of angles and delays of multipath components of the channel is available at the base station or the network node. Another advantage is to reduce latency in the CSI reporting.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. The embodiments herein may be applied in any wireless systems including LTE or 4G, LTE-A (or LTE-Advanced), 5G, advanced 5G, WiMAX, WiFi, satellite communications, TV broadcasting etc.

The invention claimed is:

1. A method performed by a user equipment (UE) for generating and reporting a channel state information (CSI) report in a wireless communications system, the method comprising:

receiving a CSI report configuration from a network node;

determining based on the received CSI report configuration, a number of precoder coefficients for Rank Index (RI) transmission layers of a precoder vector or matrix;

grouping the precoder coefficients of the RI transmission layers into at least two coefficient subsets, each coefficient subset comprising a plurality of precoder coefficients;

assigning an ordering to said at least two coefficient subsets and an ordering to the precoder coefficients within each coefficient subset;

dividing said at least two coefficient subsets into two or more CSI groups having associated priority levels;

generating a CSI report comprising a CSI part 1 and a CSI part 2, wherein the CSI part 1 has a fixed payload size and comprises information indicating the size of the payload of the CSI part 2, wherein the CSI part 2 includes the precoder coefficients of at least one of the two or more CSI groups; and transmitting an uplink control information (UCI) including the CSI report over an uplink (UL) channel to the network node, wherein each precoder coefficient is associated with four indices (l, p, d, n), wherein the first index, l, is a layer index, the second index, p, is a port or spatial beam index, the third index, d, is a delay index, and the fourth index, n, is a Doppler component index, and wherein grouping the precoder coefficients of the RI transmission layers into the at least two coefficient subsets is based on at least one of the delay index d or the Doppler component index n.

2. The method of claim 1, wherein l=0, . . . , RI−1, p=0, . . . , P'−1 or p=0, . . . , 2P'−1, d=0, . . . , D'−1, n=0, . . . , E'−1, and wherein, D' is a number of delays, and E' is a number of Doppler components.

3. The method of claim 2, wherein the precoder coefficients for the RI layers of the precoding vector or matrix are grouped into a number of non-overlapping coefficient subsets, A={$A_0, A_1, . . . , A_{N-1}$}, and each coefficient subset $A_i$ comprises precoder coefficients associated with D' delays and RI transmission layers and a number of port indices.

4. The method of claim 3, wherein the precoder coefficients of each coefficient subset $A_i$ is further grouped into a number of coefficient subsets $A_i$={$A_{i,1}, . . . , A_{i,T}$} and each coefficient subset $A_{i,j}$ comprises the precoder coefficients associated with one subset or two subsets of continuous port indices associated with a first and second polarization of the antenna ports, RI layers and a single delay index.

5. The method of claim 4, wherein the coefficient subsets $A_{i,j}$ are ordered with respect to an increasing delay index, and wherein the precoder coefficients of each coefficient subset $A_{i,j}$ are ordered with respect to an increasing port index, wherein the precoder coefficients associated with the same port index are ordered with respect to an increasing layer index.

6. The method of claim 4, wherein the coefficient subsets are ordered with respect to an increasing subset index.

7. The method of claim 2, wherein the grouping of the precoder coefficients into at least two coefficient subsets and the ordering of the coefficient subsets and the precoder coefficients within each coefficient subset are based on a new delay index d' instead of delay index d.

8. The method of claim 2, wherein a precoding vector for a transmission layer is based on P' basis vectors selected from a first basis set comprising P basis vectors, wherein, and D' basis vectors selected from a second basis set comprising D basis vectors, and E' basis vectors selected from a third basis set comprising E basis vectors, and a set of precoder coefficients for combining the selected basis vectors from the first and second and third basis sets.

9. The method of claim 8, wherein D'=D; and the precoder coefficients or the delay indices are ordered with respect to a modulo operation d'=(d−$d_r$)mod D, wherein d' is the new delay index, after the modulo operation, and $d_r$ is the reference delay index associated with the maximum or strongest coefficient.

10. The method of claim 8, wherein each basis vector from the second basis set is a DFT or IDFT vector defined over $N_3$ subbands or PRBs or frequency units and associated with a delay value, and each basis vector from the third basis set is a DFT or IDFT vector defined over $N_4$ time instants and associated with a Doppler value.

11. The method of claim 8, wherein the first basis set is given by a 2D-DFT matrix and wherein each basis vector is referred to as a spatial beam or spatial beam vector.

12. The method of claim 10, wherein the precoder coefficients per layer associated with a set of basis vectors of the second basis set are ordered with respect to basis indices f of the basis vectors, and wherein the precoder coefficients associated with the basis index f are ordered with respect to a modulo operation $f_r$=(f−$f_r$)mod $N_3$, wherein $f_r$∈{0, . . . , $N_3$−1} is a new basis index and $f_r$ is a reference basis index associated with a maximum or strongest coefficient.

13. The method of claim 1, wherein the precoder coefficients of a layer are stacked in a coefficient matrix and the CSI report comprises an indicator for indicating the location of the non-zero coefficients in the coefficient matrix, and wherein the indicator is given by a bitmap and each bit of the bitmap is associated with a precoder coefficient in the coefficient matrix, and wherein the bits in the bitmap are ordered in the same way as the coefficient subsets and the precoder coefficients in the coefficient subsets.

14. The method of claim 13, wherein the bits in the bitmap are ordered in the same way as the coefficient subsets and the precoder coefficients in the coefficient subsets.

15. A method performed by a network node for receiving a channel state information (CSI) report generated by a User Equipment (UE), in a wireless communications system, the method comprising:
  transmitting to the UE, a CSI report configuration for enabling the UE to determine based on the transmitted CSI report configuration a number of precoder coefficients for Rank Index (RI) transmission layers of a precoder vector or matrix; to group the precoder coefficients of the RI transmission layers into at least two coefficient subsets, each coefficient subset comprising a plurality of precoder coefficients; to assigning an ordering to said at least two coefficient subsets and an ordering to the precoder coefficients within each coefficient subset; and to divide said at least two coefficient subsets into two or more CSI groups having associated priority levels; and
  receiving from the UE over an uplink channel, an UCI including the CSI report generated by the UE, the CSI report comprising a CSI part 1 and a CSI part 2, wherein the CSI part 1 has a fixed payload size and comprises information indicating the size of the payload of the CSI part 2, wherein the CSI part 2 includes the precoder coefficients of at least one of the two or more CSI groups; and wherein, each precoder coefficient is associated with four indices (l, p, d, n), wherein the first index, l, is a layer index, the second index, p, is a port or spatial beam index, the third index, d, is a delay index, and the fourth index, n, is a Doppler component index, and wherein the precoder coefficients of the RI transmission layers are grouped into the at least two coefficient subsets based on at least one of the delay index d or the Doppler component index n.

16. A User Equipment (UE) comprising a processor and a memory, said memory containing instructions executable by said processor whereby said UE is operative to:
  receive a CSI report configuration from a network node;
  determine based on the received CSI report configuration, a number of precoder coefficients for Rank Index (RI) transmission layers of a precoder vector or matrix;
  group the precoder coefficients of the RI transmission layers into at least two coefficient subsets, each coefficient subset comprising a plurality of precoder coefficients;
  assign an ordering to said at least two coefficient subsets and an ordering to the precoder coefficients within each coefficient subset;
  divide said at least two coefficient subsets into two or more CSI groups having associated priority levels;
  generate a CSI report comprising a CSI part 1 and a CSI part 2, wherein the CSI part 1 has a fixed payload size and comprises information indicating the size of the payload of the CSI part 2, wherein the CSI part 2 includes the precoder coefficients of at least one of the two or more CSI groups; and transmit an uplink control information (UCI) including the CSI report over an uplink (UL) channel to the network node, wherein each precoder coefficient is associated with four indices (l, p, d, n), wherein the first index, l, is a layer index, the second index, p, is a port or spatial beam index, the third index, d, is a delay index, and the fourth index, n, is a Doppler component index, and wherein said UE is operative to group the precoder coefficients of the RI transmission layers into the at least two coefficient subsets based on at least one of the delay index d or the Doppler component index n.

17. A network node comprising a processor and a memory, said memory containing instructions executable by said processor whereby said network node is operative to:

transmit to a User Equipment (UE), a channel state information (CSI) report configuration for enabling the UE to determine based on the transmitted CSI report configuration a number of precoder coefficients for Rank Index (RI) transmission layers of a precoder vector or matrix; to grouping the precoder coefficients of the RI transmission layers into at least two coefficient subsets, each coefficient subset comprising a plurality of precoder coefficients; to assigning an ordering to said at least two coefficient subsets and an ordering to the precoder coefficients within each coefficient subset; and to divide said at least two coefficient subsets into two or more CSI groups having associated priority levels; and receive from the UE over an uplink channel, an UCI including the CSI report generated by the UE, the CSI report comprising a CSI part 1 and a CSI part 2, wherein the CSI part 1 has a fixed payload size and comprises information indicating the size of the payload of the CSI part 2, wherein the CSI part 2 includes the precoder coefficients of at least one of the two or more CSI groups; and wherein, each precoder coefficient is associated with four indices (l, p, d, n), wherein the first index, l, is a layer index, the second index, p, is a port or spatial beam index, the third index, d, is a delay index, and the fourth index, n, is a Doppler component index, and wherein the precoder coefficients of the RI transmission layers are grouped into the at least two coefficient subsets based on at least one of the delay index d or the Doppler component index n.

\* \* \* \* \*